(12) United States Patent
Ke et al.

(10) Patent No.: US 12,010,578 B2
(45) Date of Patent: *Jun. 11, 2024

(54) SERVICE INDICATION METHOD AND RELEVANT DEVICES

(71) Applicant: VIVO MOBILE COMMUNICATION CO., LTD., Guangdong (CN)

(72) Inventors: Xiaowan Ke, Guangdong (CN); Li Huang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,941

(22) Filed: Aug. 30, 2022

(65) Prior Publication Data

US 2022/0417815 A1    Dec. 29, 2022

Related U.S. Application Data

(63) Continuation of application No. 16/962,281, filed as application No. PCT/CN2019/071864 on Jan. 16, 2019, now Pat. No. 11,470,526.

(30) Foreign Application Priority Data

Jan. 16, 2018  (CN) .......................... 201810041445.2

(51) Int. Cl.
*H04W 36/00*  (2009.01)
*H04W 4/021*  (2018.01)
(Continued)

(52) U.S. Cl.
CPC ........... *H04W 36/14* (2013.01); *H04W 4/022* (2013.01); *H04W 4/90* (2018.02);
(Continued)

(58) Field of Classification Search
CPC . H04W 36/14; H04W 36/0022; H04W 48/18; H04W 76/10; H04W 88/06;
(Continued)

(56) References Cited

U.S. PATENT DOCUMENTS

2010/0329243 A1    12/2010  Buckley et al.
2012/0224563 A1*    9/2012  Zisimopoulos ....... H04W 36/24
                                               455/435.2
(Continued)

FOREIGN PATENT DOCUMENTS

WO       2017059532 A1    4/2017

OTHER PUBLICATIONS

First Office Action for Japanese Application No. 2020-539216, dated Aug. 27, 2021, 5 Pages.
International Search Report and Written Opinion for Application No. PCT/CN2019/071864, dated Mar. 13, 2019, 9 Pages.
Extended European Search Report for Application No. 19741012.9-1213, dated Nov. 6, 2020, 12 Pages.
(Continued)

*Primary Examiner* — Erika A Washington
(74) *Attorney, Agent, or Firm* — Brooks Kushman P.C.

(57) ABSTRACT

A service indication method includes: acquiring service indication information, the service indication information including at least one of support information about a service and preference information about the service, the service including at least one of an emergency service and a voice service; and performing a relevant operation on the service in accordance with the acquired service indication information.

20 Claims, 9 Drawing Sheets

(51) Int. Cl.
  *H04W 4/90* (2018.01)
  *H04W 28/02* (2009.01)
  *H04W 36/14* (2009.01)
  *H04W 48/16* (2009.01)
  *H04W 48/18* (2009.01)

(52) U.S. Cl.
  CPC ... *H04W 28/0268* (2013.01); *H04W 36/0022* (2013.01); *H04W 48/16* (2013.01); *H04W 48/18* (2013.01)

(58) Field of Classification Search
  CPC ... H04W 4/90; H04W 4/022; H04W 28/0268; H04W 48/16
  See application file for complete search history.

(56) References Cited

U.S. PATENT DOCUMENTS

| | | | |
|---|---|---|---|
| 2015/0055554 A1 | 2/2015 | Seclacek et al. | |
| 2020/0015128 A1* | 1/2020 | Stojanovski | H04W 76/50 |
| 2020/0288367 A1* | 9/2020 | Kim | H04W 36/36 |

OTHER PUBLICATIONS

Non-final Rejection for U.S. Appl. No. 16/962,281, dated Jun. 3, 2021, 16 Pages.

Final Rejection for U.S. Appl. No. 16/962,281, dated Sep. 15, 2021, 23 Pages.

Ericsson et al., "Input to Multiple Key Issues: NextGen Core Support for IMS," 3GPP TSG-SA WG2 Meeting #117, Agenda item 6.10.1, 6.10.2, 6.10.4 and 6.10.18, Oct. 17-21, 2016, S2-165565, Kaohsiung City,m, Taiwan, 6 Pages.

Ericsson, "TS 23.501: EPS Fallback for Voice," SA WG2 Meeting #124, Agenda item 6.5.8, Nov. 27-Dec. 1, 2017, S2-178544, Reno, Nevada, USA, 4 Pages.

Charter Communications et al., "TS 23.501: EPS Fallback," SA WG2 Meeting #S2-124, Agenda item 6.5.9, Nov. 27-Dec. 1, 2017, S2-178637, Reno, Nevada, USA, 6 Pages.

First Office Action for Japanese Application No. 2022-133777, dated Aug. 17, 2023, 6 Pages.

Ericsson "TS 23.502: EPS Fallback for voice" SA WG2 Meeting #124, Reno, USA, Dec. 2017, S2-178545, 5 Pages.

* cited by examiner

SERVICE INDICATION METHOD AND RELEVANT DEVICES

CROSS-REFERENCE TO RELATED APPLICATIONS

This application is a continuation application of U.S. patent application Ser. No. 16/962,281 filed on Jul. 15, 2020, which is the U.S. national phase of PCT Application No. PCT/CN2019/071864 filed on Jan. 16, 2019, which claims priority to Chinese Patent Application No. 201810041445.2 filed on Jan. 16, 2018, which are incorporated herein by reference in their entireties.

TECHNICAL FIELD

The present disclosure relates to the field of communications technology, in particular to service indication methods and relevant devices and relevant non-transitory computer-readable storage media.

BACKGROUND $5^{th}$-Generation ($5^{th}$ Generation, 5G) communications system may include a new radio (New Radio, NR) network element and an enhanced long term evolution (enhanced Long Term Evolution, eLTE) network element. The NR network element (e.g., an NR base station) is a real 5G network element, while the eLTE network element (e.g., an eLTE base station) is a cell eLTE network element accessing a 5G core network. Currently, the 5G communications system includes various radio access networks, and there is an urgent need to provide a scheme for a terminal to perform relevant operations on services effectively.

SUMMARY

In one aspect, the present disclosure provides in an embodiment a non-transitory computer-readable storage medium storing therein a computer program, wherein the computer program is executed by a processor of a Radio Access Network (RAN) so as to implement a service indication method. Specifically the service indication method includes: acquiring service indication information from an Access and Mobility Management Function (AMF) and a Packet Data Unit (PDU) session or Quality of Service (QoS) flow establishment request for a service, the service indication information including support information about the service, the service including at least one of an emergency service or a voice service; and preforming a relevant operation on the service in accordance with the acquired service indication information and the PDU session or the QoS flow establishment request for the service. Specifically the support information about the service includes service support type information; wherein the service support type information is used to indicate whether redirection to Evolved Packet System (EPS) for supporting the service is possible or not. And the performing the relevant operation on the service in accordance with the service indication information includes one of: accepting a PDU session or QoS flow establishment request for the service, handing over the terminal to an enhanced Long Term Evolution (eLTE), handing over the terminal to an EPS, or re-directing the terminal to an EPS.

In another aspect, the present disclosure provides in an embodiment an AMF, including a memory, a processor, and a program stored in the memory and executed by the processor. And the processor is configured to execute the program so as to implement a service indication method. The service indication method includes: acquiring service capability information; and determining service indication information in accordance with the acquired service capability information and transmitting the service indication information to an RAN, the service indication information including support information about a service, the service including at least one of an emergency service or a voice service. Specifically the support information about the service includes service support type information. And the service support type information is used to indicate whether redirection to EPS for supporting the service is possible or not. Specifically the acquiring the service capability information includes at least one of: receiving service capability information about a terminal from the terminal, the service capability information being used to indicate whether the service is supported by the terminal.

In yet another aspect, the present disclosure provides in an embodiment a non-transitory computer-readable storage medium storing therein a computer program. And the computer program is executed by a processor of an AMF so as to implement a service indication method. The service indication method includes: acquiring service capability information; and determining service indication information in accordance with the acquired service capability information and transmitting the service indication information to an RAN, the service indication information including support information about a service, the service including at least one of an emergency service or a voice service. Specifically the support information about the service includes service support type information. And the service support type information is used to indicate whether redirection to EPS for supporting the service is possible or not. And the acquiring the service capability information includes at least one of: receiving service capability information about a terminal from the terminal, the service capability information being used to indicate whether the service is supported by the terminal.

BRIEF DESCRIPTION OF THE DRAWINGS

In order to illustrate the technical solutions of embodiments of the present disclosure in a clearer manner, the drawings used by embodiments of the present disclosure will be described hereinafter briefly. Obviously, the following drawings merely relate to embodiments of the present disclosure, and based on these drawings, a person skilled in the art may obtain the other drawings without any creative effort.

DETAILED DESCRIPTION

The present disclosure will be described hereinafter in a clear and complete manner in conjunction with a drawing in an embodiment. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
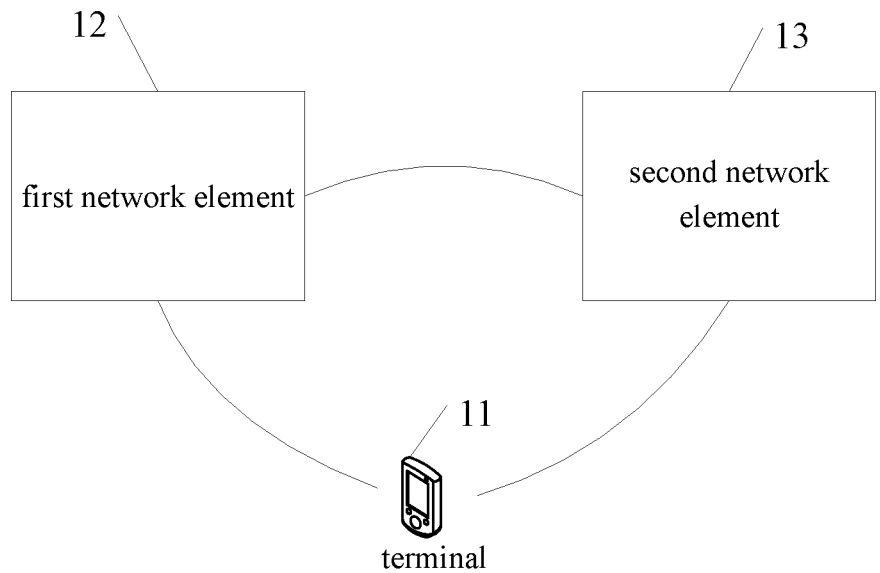
FIG. 1 is a structural figure showing an available service indication system according to an embodiment of the present disclosure.

FIG. 1 shows a structural figure of an available service indication system according to an embodiment of the present disclosure. As shown in FIG. 1, the service indication system includes a terminal 11, a first network element 12 and a second network element 13.

The terminal 11 may be a user equipment (UE), e.g., mobile phone, tablet personal computer (Tablet Personal Computer), laptop computer (Laptop Computer), personal digital assistant (Personal Digital Assistant, PDA), mobile Internet device (Mobile Internet Device, MID) or wearable device. It should be appreciated that, a specific type of the terminal 11 will not be particularly defined herein.

The first network element 12 may be any network side device or network function. For example, the first network element 12 may be a radio access network network element or a core network network element. In addition, the first network element 12 may interact with the terminal 11 or any other network element. The second network element 13 may be any network side device or network function different from the first network element 12, and it may be a radio access network network element or a core network network element.

In an embodiment of the present disclosure, the core network network element may include at least one of a core network device, a core network node, a core network function, a core network network unit, a mobility management entity (Mobility Management Entity, MME), an access management function (Access Management Function, AMF), a session management function (Session Management Function, SMF), a user plane function (User Plane Function, UPF), a serving gateway (serving GW, SGW), a PDN gateway (PDN Gate Way, PDN gateway), a policy control function (Policy Control Function, PCF), a policy and charging rules function (Policy and Charging Rules Function, PCRF), a serving general packet radio service support node (Serving GPRS Support Node, SGSN), a gateway GPRS support node (Gateway GPRS Support Node, GGSN) wireless access network device.

In an embodiment of the present disclosure, the RAN network element may include at least one of an RAN device, an RAN node, an RAN function, an RAN unit, a $3^{rd}$-Generation partnership project (3GPP) RAN, a non-3GPP RAN, a centralized unit (Centralized Unit, CU), a distributed unit (Distributed Unit, DU), a base station, an evolved Node B (eNB), a gNB, a radio network controller (Radio Network Controller, RNC), a Node B, a non-3GPP Inter-Working function (Non-3GPP InterWorking Function, N3IWF), an access controller (Access Controller, AC) node, an access point (Access Point, AP) device, or a wireless local area networks (Wireless Local Area Networks, WLAN) node.

The base station may be a base transceiver station (Base Transceiver Station, BTS) in a global system for mobile communications or CDMA, a Node B in a WCDMA, an evolved Node B (eNB or e-NodeB, evolutional Node B) in LTE, or a 5G base station (gNB), which will not be particularly defined herein.

In an embodiment of the present disclosure, service support type information may also be represented as service support mode information or service support method information. The service support type information may indicate information that the service is supported by different implementation modes.

In an embodiment of the present disclosure, in a mode in which the service is supported in a fallback mode, a terminal may initiate a service request and then a network may perform a subsequent operation. The subsequent operation may include rolling back the terminal to the network directly supporting the service, e.g., handing over the terminal to an eLTE, handing over the terminal to an evolved packet system (EPS), or re-directing the terminal to an EPS. The eLTE or the EPS may directly support the service.

In an embodiment of the present disclosure, a service support indicator may be used to indicate whether the terminal is initiating packet data unit (PDU) session establishment for the service, and then the network may perform a subsequent operation. For example, the subsequent operation may include establishing the service for the terminal on a current network, handing over the terminal to the eLTE, handing over the terminal to an EPS, or re-directing the terminal to an EPS.

In an embodiment of the present disclosure, eLTE is a mode where EUTRA is directly connected to 5GC, and an EPS may also be called as LTE.

In an embodiment of the present disclosure, an emergency service may also be called as one of emergency voice service, or emergency Internet protocol (IP) multimedia subsystem (IMS) voice service.

In an embodiment of the present disclosure, a voice service may also be called as IMS voice service over PS domain session mode.

Figure 2:
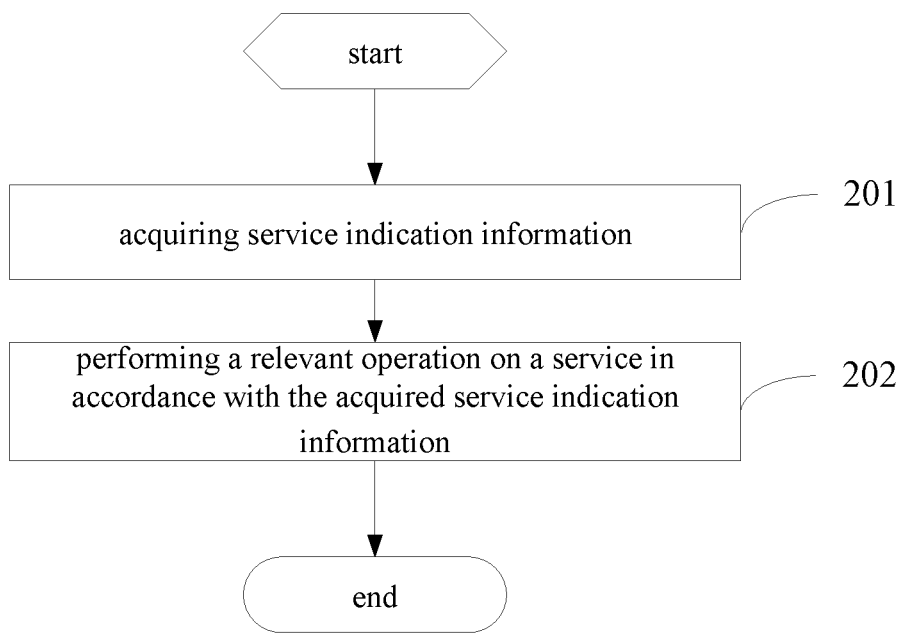
FIG. 2 is a flow chart of a service indication method according to an embodiment of the present disclosure.

The present disclosure provides in an embodiment a service indication method for a terminal which, as shown in FIG. 2, includes the following steps.

Step 201: acquiring service indication information, the service indication information including at least one of support information about a service and preference information about the service, the service including at least one of an emergency service and a voice service.

The service indication information may be received from a network side device, e.g., from the first network element or the second network element in the system as shown in FIG. 1. In addition, it should be appreciated that, when the service includes at least one of the emergency service and the voice service, the service may include the emergency service or the voice service, or both. The emergency service may be an emergency voice service, e.g., making a police call or an emergency call, which will not be particularly defined herein. The voice service may be an IP multimedia subsystem (IP Multimedia Subsystem, IMS) voice service over PS domain session (IMS voice over PS Session Supported Indication), or any other voice service, which will not be particularly defined herein.

The support information about the service may be used to indicate whether the above service is supported, e.g., indicate that the above service is supported by the network side device, so the terminal may initiate a corresponding service in accordance with the support information about the service, so as to improve the service performance of the terminal.

The preference information about the service may be used to indicate a preference of performing, by the network side device, an operation for the service, e.g., a preference of initiating PDU session establishment for the service, a preference of initiating a service request for the service, a preference of initiating PDU session establishment for the service preferentially and then initiating a service request for the service, or a preference of initiating a service request for the service preferentially and then initiating PDU session establishment for the service. Based on the preference information about the service, it is able for the terminal to initiate the service in a corresponding mode, such that a problem where the terminal can hardly determine in which mode the service should be initiated is prevented, thereby to improve the service performance of the terminal.

Step 202: performing a relevant operation on the service in accordance with the acquired service indication information.

The performing the relevant operation on the service in accordance with the acquired service indication information may include: determining whether the service is supported in accordance with the support information about the service in the service indication information, and when the service is supported, initiating the service; or performing an operation corresponding to the preference information about the service, e.g., initiating the service request or the session establishment, which will not be particularly defined herein.

Through the above steps, the terminal may acquire the service indication information and perform the relevant operation on the service effectively, so as to improve the service performance of the terminal.

It should be appreciated that, the above method may be applied to, but not limited to, a 5G system. In other words, the method may be applied to any other communications system, e.g., a $6^{th}$-Generation ($6^{th}$ Generation, 6G) system or any other communications system where the service indication information is used, as long as a substantially same function may be achieved.

Optionally, the service indication information may further include service operation information.

Optionally, prior to acquiring the service indication information, the service indication method may further include transmitting service capability information about the terminal to a first network element, and the service capability information may be used to indicate whether the terminal supports the service.

Optionally, the support information about the service may include at least one of a service support indicator and service support type information.

Optionally, the service support indicator may be used to indicate whether the service is supported, or the service support indicator may be used to indicate at least one of whether the service is supported by an NR, whether the service is supported by an eLTE, and whether the service is supported by an EPS.

Optionally, whether the service is supported by an EPS may include at least one of whether the terminal is supported to be handed over to an EPS to support the service and whether the terminal is supported to be re-directed to an EPS to support the service.

Optionally, the service support type information may be used to indicate support type for the service, or the service support type information may be used to indicate at least one of whether the service is supported by an NR, whether the service is supported by an eLTE, whether the service is supported by an EPS, whether the terminal is handed over to an EPS to support the service, and whether the terminal is re-directed to an EPS to support the service.

Optionally, the service indication information may further include indication information indicating whether the service is supported in a fallback mode. In an embodiment of the present disclosure, the indication information indicating whether the service is supported in the fallback mode may include one of whether the terminal is supported to be handed over to the eLTE for a fallback operation, whether the terminal is supported to be handed over to an EPS for the fallback operation, and whether the terminal is supported to be re-directed to an EPS for the fallback operation. A target network (e.g., an eLTE or an EPS) acquired through the fallback operation may directly support the service.

Optionally, the preference information about the service may include at least one of preference information indicating a preference of initiating PDU session establishment for the service, preference information indicating a preference of initiating a service request for the service, preference information indicating a preference of initiating PDU session establishment for the service preferentially and then initiating a service request for the service, and preference information indicating a preference of initiating a service request for the service preferentially and then initiating PDU session establishment for the service.

Optionally, the service indication information may be a piece of service indication information at a location area, and a different piece of service indication information may correspond to a different location area respectively, i.e., the pieces of service indication information at different location areas (e.g., tracking areas (Tracking Areas, TAs)) may be different.

According to the embodiments of the present disclosure, the service indication information may be acquired, the service indication information may include at least one the support information about the service and the preference information about the service, and the service may include at least one of the emergency service and the voice service. Next, the relevant operation may be on the service in accordance with the acquired service indication information. As a result, it is able for the terminal to perform the relevant operation on the services effectively in accordance with the service indication information.

Figure 3:
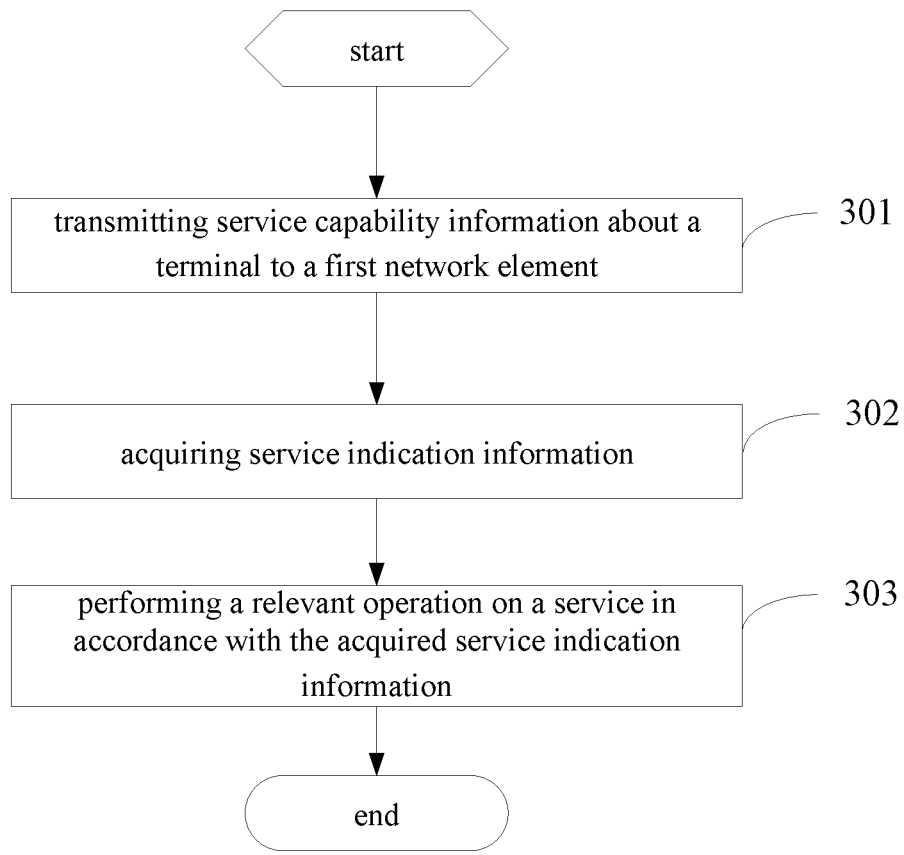
FIG. 3 is a flow chart of another service indication method according to an embodiment of the present disclosure.

The present disclosure further provides in an embodiment a service indication method for a terminal which, as shown in FIG. 3, includes the following steps.

Step 301: transmitting service capability information about the terminal to a first network element, the service capability information being used to indicate whether the terminal supports the service.

The service capability information may be transmitted during a registration procedure, a connection establishment procedure or a service request procedure. Based on the service capability information, it is able for the first network element to determine a terminal capability, thereby to determine the corresponding service indication information in accordance with the terminal capability.

It should be appreciated that, Step 301 may be optional. For example, the first network element may acquire the capability information about the terminal in advance, or determine that the terminal supports the service by default, which will not be particularly defined herein.

Step 302: acquiring service indication information, the service indication information including at least one of support information about the service and preference information about the service, the service including at least one of an emergency service and a voice service.

The service indication information may be received from the first network element. For example, the terminal may transmit the capability information via a registration request message, and the first network element may transmit to the terminal a registration acceptance message including the service indication information. Of course, the terminal may transmit a service request or a session establishment request for the service to the first network element, and the first network element may transmit to the terminal a corresponding fallback message including the service indication information.

Step 303: performing a relevant operation on the service in accordance with the acquired service indication information.

In an embodiment of the present disclosure, the support information about the service may include at least one of a service support indicator and service support type information.

The service support indicator may be used to indicate whether the service is supported. For example, when the service is supported by one or more of an NR, an eLTE or an EPS, the service support indicator may be used to indicate that the service is to be supported by one bit. In this regard, it is able to simplify a procedure of determining whether to initiate the service by the terminal.

The 5G system may support the service in, but not limited to, at least one of the following modes.

In a first mode, the 5G system supports the service (at least one of the emergency service and the voice service), e.g., the NR and the 5G core network (5GC) may directly support the emergency service.

In a second mode, when a quality of service (Quality of Service, QoS) flow or a PDU session has been established for the service (at least one of the emergency service and the voice service), an evolved-UMTS terrestrial radio access (Evolved-UMTS Terrestrial Radio Access, E-UTRAN) may be connected to the 5G core network (5GC) to support the service, and a 5G radio access network (NG RAN) may switch the terminal to the E-UTRAN of the 5GC.

In a third mode, when the QoS flow or PDU session has been established for the service (at least one of the emergency service and the voice service), the 5G RAN may switch the terminal to an EPS, and the EPS may support an emergency session.

In a fourth mode, when the QoS flow or PDU session has been established for the service (at least one of the emergency service and the voice service), the 5G RAN may trigger the terminal to be re-directed to an EPS, and the EPS may support the emergency session.

In this regard, in any one of the above modes, the service support indicator may indicate that the service is supported.

In a possible embodiment of the present disclosure, when the service support type information indicates that the emergency service is supported by the NR, the service support indicator may indicate that the service is supported.

In another possible embodiment of the present disclosure, when the service support type information indicates that the emergency service is supported by the eLTE, the service support indicator may indicate that the service is supported.

In yet another possible embodiment of the present disclosure, when the service support type information indicates that the emergency service is not supported by the eLTE nor the NR but the terminal is supported by the network to be handed over or re-directed to an EPS, the service support indicator may indicate that the service is supported.

For example, Table 1 and Table 2 show situations by taking a TA and the emergency service as an example.

TABLE 1

| NR supports the emergency service within TA | eLTE supports the emergency service within TA | EPS supports the emergency service, and 5G RAN supports the handing over of UE to EPS | EPS supports the emergency service, and 5G RAN supports the re-directing of UE to EPS | Emergency service support indicator |
|---|---|---|---|---|
| 1 | — | — | — | Y |
| — | 1 | — | — | Y |
| — | — | 1 | — | Y |
| — | — | — | 1 | Y |

TABLE 2

| NR supports the emergency service within TA | eLTE supports the emergency service within TA | EPS supports the emergency service, and 5G RAN supports the handing over of UE to EPS | EPS supports the emergency service, and 5G RAN supports the re-directing of UE to EPS | Emergency service support indicator | Emergency service support type information |
|---|---|---|---|---|---|
| 1 | 0 | — | —t | Y | TA_NR = Y TA_eLTE = N |

TABLE 2-continued

| NR supports the emergency service within TA | eLTE supports the emergency service within TA | EPS supports the emergency service, and 5G RAN supports the handing over of UE to EPS | EPS supports the emergency service, and 5G RAN supports the re-directing of UE to EPS | Emergency service support indicator | Emergency service support type information |
|---|---|---|---|---|---|
| 1 | 1 | — | — | Y | TA_NR = Y |
|   |   |   |   |   | TA_eLTE = Y |
| 0 | 1 | — | — | Y | TA_eLTE = Y |
| 0 | 0 | 1 | — | Y | TA_NR = N |
|   |   |   |   |   | TA_eLTE = N |
| 0 | 0 | — | 1 | Y | TA_NR = N |
|   |   |   |   |   | TA_eLTE = N |

In the above tables, TA_NR=Y represents that the NR supports the emergency service within the TA, TA_eLTE=N represents that the eLTE does not support the emergency service within the TA, TA_NR=N represents that the NR does not support the emergency service, and TA_eLTE=Y represents that the eLTE supports the emergency service within the TA.

In addition, the service support type information may be used to indicate at least one of whether the service is supported by an NR, whether the service is supported by an eLTE, whether the service is supported by an EPS, whether the service is supported by handing over the terminal to an EPS, and whether the service is supported by re-directing the terminal to an EPS. In this regard, an NR service support indicator, an eLTE service support indicator and an EPS service support indicator may be indicated through three bits respectively, so as to reduce signaling overhead.

The service support indicator may be used to indicate at least one of whether the service is supported by an NR, whether the service is supported by an eLTE, whether the terminal is supported to be handed over to an EPS to support the service and whether the terminal is supported to be re-directed to an EPS to support the service. When the terminal supported to be handed over or re-directed to an EPS to support the service, an EPS may support the service by default. In this regard, an NR emergency service support indicator, EPS handing over support information and EPS re-directing support information may be indicated through four bits.

Of course, in an embodiment of the present disclosure, the service support indicator may be used to indicate, apart from whether the service is supported, at least one of whether the service is supported by an NR, whether the service is supported by an eLTE, whether the terminal is supported to be handed over to an EPS to support the service, and whether the terminal is supported to be re-directed to an EPS to support the service. In this regard, the terminal may determine whether the service is supported and a corresponding service support mode when the service is supported. At this time, a user may know how the emergency service is realized, so it is able to prevent the occurrence of cheating.

In addition, the service support type information may be used to indicate an implementation mode of the service in the network. For example, the service support type information may be used to indicate support type for the service; or the service support type information may be used to indicate at least one of whether the service is supported by an NR, whether the service is supported by an eLTE, and whether the service is supported by an EPS.

Whether the service is supported by the EPS may include at least one of whether the terminal is handed over to an EPS to support the service and whether the terminal is re-directed to an EPS to support the service.

In an embodiment of the present disclosure, based on the service support type information, it is able for the terminal to determine the service support mode. As a result, it is able for the user to know how the emergency service is realized, thereby to prevent the occurrence of cheating.

Optionally, the service indication information may further include indication information indicating whether the service is supported in a fallback mode. The indication information may be called as support information about the service in a fallback mode.

In Step 302, the support information about the service may be support information about the service in a non-fallback mode. Of course, in Step 302, the support information about the service may include at least one of the support information about the service in a non-fallback mode and the support information about the service in a fallback mode. The support information about the service in a non-fallback mode may be used to indicate whether the service is supported in any mode other than the fallback mode (i.e., the non-fallback mode), e.g., whether the service is supported to be initiated directly by the terminal, or whether the service is to supported to be initiated through scheduling by the network side device.

In an embodiment of the present disclosure, the support information about the service in a fallback mode may be used to indicate the terminal whether the service is supported in a fallback mode, so it is able for the terminal to transmit the service in a fallback mode.

Optionally, when a predetermined condition has been met, the service indication information may include the preference information about the service.

The preference information about the service may include at least one of preference information about the emergency service and preference information about the voice service.

In an embodiment of the present disclosure, after the first network element determines that the predetermined condition has been met, the preference information about the service may be carried in the transmitted service indication information.

In addition, in an embodiment of the present disclosure, the service indication information may include both the preference information about the service and the support information about the service in a fallback mode. Of course, in the absence of the support information about the service in a fallback mode, the service indication information may also include the preference information about the service, which will not be particularly defined herein.

The predetermined condition may be predefined in a protocol, or configured by the network side device.

Optionally, the predetermined condition may include, but not limited to, at least one of a condition where the support information about the service indicates that the service is supported, and a condition where the support information about the service in a fallback mode indicates that the service is supported in a fallback mode.

In an embodiment of the present disclosure, in the case that the service is supported, the preference information about the service may be configured for the terminal, so as to enable the terminal to initiate the service in a corresponding mode.

To be specific, the predetermined condition may include at least one of a condition where the support information about the service indicates that the emergency service is to be supported and to be supported in a fallback mode, a condition where the support information about the service indicates that the voice service is to be supported, a condition where the support information about the service indicates that the voice service is to be supported in a fallback mode, and a condition where the support information about the service indicates that the voice service is to be supported and to be supported in a fallback mode.

For example, when at least one of a condition where the emergency service support indicator indicates that the emergency service is to be supported, a condition where the emergency service support indicator indicates that the emergency service is to be supported in a fallback mode, a condition where the emergency service support indicator indicates that the emergency service is to be supported and to be supported in a fallback mode, a condition where a PS voice service support indicator indicates that the voice service is to be supported, a condition where an EPS fallback indicator indicates that the service is supported in a service request mode, and a condition where the PS voice service support indicator indicates that the voice service is to be supported and the EPS fallback indicator indicates that the service is supported in a service request mode has been met, the service indication information may include at least one of the preference information about the emergency service and the preference information about the voice service.

Optionally, when the emergency service support indicator indicates that the emergency service is to be supported and to be supported in a fallback mode, the preference information about the service may include preference information about the emergency service. When the PS voice service support indicator indicates that the voice service is to be supported and the EPS fallback indicator indicates that the service is supported in a service request mode, the preference information about the service may include preference information about the emergency service.

In addition, when the support information about the service indicates that the service is supported, the terminal is initiating PDU session establishment for the service. When the service support information in a fallback mode indicates that the service is supported in a fallback mode, the terminal is initiating a service request for the service. Hence, the terminal may initiate different requests at different conditions, so as to further improve the service performance of the terminal.

Optionally, the preference information about the service may include at least one of preference information indicating a preference of initiating PDU session establishment for the service, preference information indicating a preference of initiating a service request for the service, preference information indicating a preference of initiating PDU session establishment for the service preferentially and then initiating a service request for the service, and preference information indicating a preference of initiating a service request for the service preferentially and then initiating PDU session establishment for the service.

For example, the preference information about the emergency service may include at least one of preference information indicating a preference of initiating PDU session establishment for the emergency service, preference information indicating a preference of initiating a service request for the emergency service, preference information indicating a preference of initiating PDU session establishment for the emergency service preferentially and then initiating the service request for the emergency service, and preference information indicating a preference of initiating the service request for the emergency service preferentially and then initiating PDU session establishment for the emergency service.

The preference information about the voice service may include at least one of preference information indicating a preference of initiating PDU session establishment for the voice service, preference information indicating a preference of initiating a service request for the voice service, preference information indicating a preference of initiating PDU session establishment for the voice service preferentially and then initiating the service request for the voice service, and preference information indicating a preference of initiating the service request for the voice service preferentially and then initiating PDU session establishment for the voice service.

Through the preference information about the service, it is able for the terminal to initiate the service in a corresponding mode, i.e., determine the mode for initiating the service, thereby to improve the service performance of the terminal.

It should be appreciated that, the terminal may initiate a corresponding service behavior in accordance with the preference information about the service. For example, when the emergency service or voice service needs to be initiated, a service request or a PDU session request may be initiated in accordance with the preference information; or when merely the PDU session establishment for the emergency service tends to be initiated, the PDU session establishment for the emergency service may be initiated; or when merely the service request for the emergency service tends to be initiated, the service request for the emergency service may be initiated; or when the PDU session establishment for the emergency service needs to be initiated preferentially, the PDU session establishment for the emergency service may be initiated preferentially; or when the service request for the emergency service needs to be initiated preferentially, the service request for the emergency service may be initiated preferentially.

Optionally, the service indication information may be a piece of service indication information at a location area, and a different piece of service indication information may correspond to a different location area respectively.

In an embodiment of the present disclosure, the service indication information may be provided in accordance with the location areas (e.g., TAs), and different location areas (e.g., TAs) may correspond to different pieces of service indication information. Further, radio access technologies (Radio Access Technologies, RATs) may also be differentiated from each other, so as to provide different pieces of service indication information at different location areas (e.g., TAs) using different RATs, thereby to improve the accuracy of the service indication information.

In an embodiment of the present disclosure, on the basis of the method in FIG. 2, various possible implementation modes have been added, so as to enable the terminal to perform the relevant operation on the service effectively, thereby to improve the service performance of the terminal.

Figure 4:
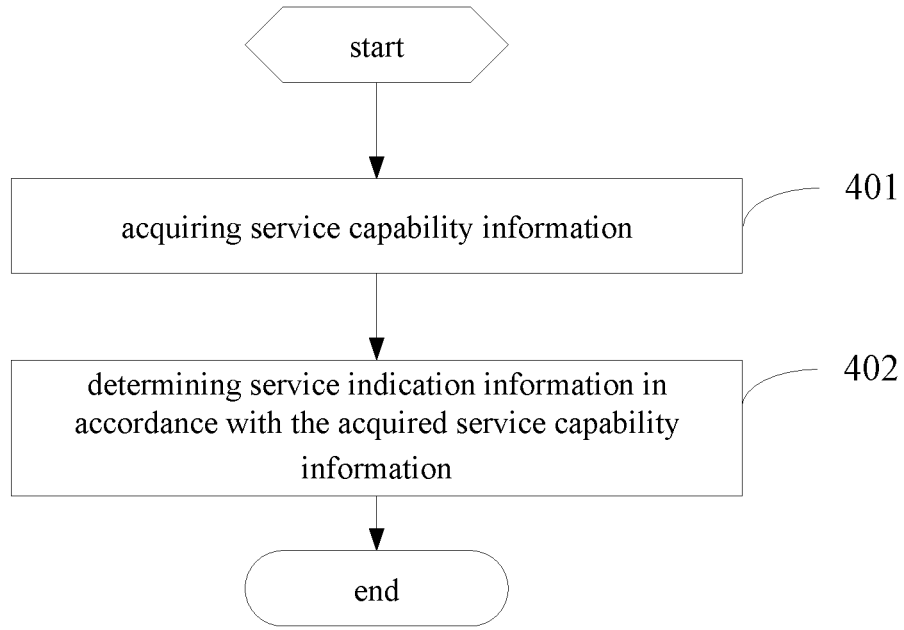
FIG. 4 is a flow chart of yet another service indication method according to an embodiment of the present disclosure.

The present disclosure further provides in an embodiment a service indication method for a first network element which, as shown in FIG. 4, includes: Step 401 of acquiring service capability information; and Step 402 of determining service indication information in accordance with the acquired service capability information, the service indication information including at least one of support information about a service, service operation information and preference information about the service, the service including at least one of an emergency service and a voice service.

Optionally, the acquiring the service capability information may include at least one of: receiving the service capability information about a terminal from the terminal, the service capability information being used to indicate whether the terminal supports the service; and receiving the service capability information about a second network element from the second network element, the service capability information being used to indicate whether the second network element supports the service.

Optionally, the service capability information about the terminal may include at least one of whether the service is supported in a non-fallback mode, whether the service is supported in a fallback mode, whether an EPS is to be supported, whether the terminal is supported to be handed over to an EPS, whether the terminal is supported to be re-directed to an EPS, whether PDU session establishment for the service is supported to be initiated, and whether a service request for the service is supported to be initiated; and/or the service capability information about the second network element may include at least one of whether the service is supported in a non-fallback mode, whether the service is supported in a fallback mode, whether the terminal is supported to be handed over to a network supporting the service, whether the terminal is supported to be handed over to an EPS, whether the terminal is supported to be re-directed to an EPS, and whether the service is supported directly.

Optionally, subsequent to determining the service indication information, the service indication method may further include at least one of transmitting the service indication information to the terminal and transmitting the service indication information to the second network element.

It should be appreciated that, the transmitting the service indication information to the terminal may be optional. For example, the service indication information may be merely transmitted to the second network element, and then the second network element may schedule the terminal to perform the relevant operation on the service in accordance with the service indication information, or the second network element may transmit the service indication information to the terminal.

Optionally, the support information about the service may include at least one of a service support indicator and service support type information.

Optionally, the service support indicator may be used to indicate whether the service is supported, or the service support indicator may be used to indicate at least one of whether the service is supported by an NR, whether the service is supported by an eLTE, and whether the service is supported by an EPS.

In an embodiment of the present disclosure, whether the service is supported by the EPS may include at least one of whether the terminal is supported to be handed over to an EPS to support the service and whether the terminal is supported to be re-directed to an EPS to support the service.

Optionally, the service support type information may be used to indicate support type for the service, or the service support type information may be used to indicate at least one of whether the service is supported by an NR, whether the service is supported by an eLTE, and whether the service is supported by an EPS.

Optionally, the service indication information may further include indication information indicating whether the service is supported in a fallback mode.

Optionally, the service operation information may include at least one of indication information indicating that a PDU session for the service is to be accepted or a request for establishing a QoS flow is to be accepted, indication information indicating that the terminal is to be handed over to the eLTE, indication information indicating that the terminal is to be handed over to an EPS, and indication information indicating that the terminal is to be re-directed to an EPS.

Optionally, when a predetermined condition has been met, the service indication information may include the preference information about the service.

Optionally, the predetermined condition may include at least one of a condition where the support information about the service indicates that the service is supported, and a condition where the support information about the service in a fallback mode indicates that the service is supported in a fallback mode.

Optionally, the preference information about the service may include at least one of preference information indicating a preference of initiating PDU session establishment for the service, preference information indicating a preference of initiating a service request for the service, preference information indicating a preference of initiating PDU session establishment for the service preferentially and then initiating a service request for the service, and preference information indicating a preference of initiating a service request for the service preferentially and then initiating PDU session establishment for the service.

Optionally, the service indication information may be a piece of service indication information at a location area, and a different piece of service indication information may correspond to a different location area respectively, i.e., the pieces of service indication information at different location areas (e.g., TAs) may be different.

It should be appreciated that, the implementation of the method in an embodiment of the present disclosure may refer to the relevant description about the first network element in FIG. 2 and FIG. 3 with a same beneficial effect, and thus will not be particularly defined herein.

Figure 5:
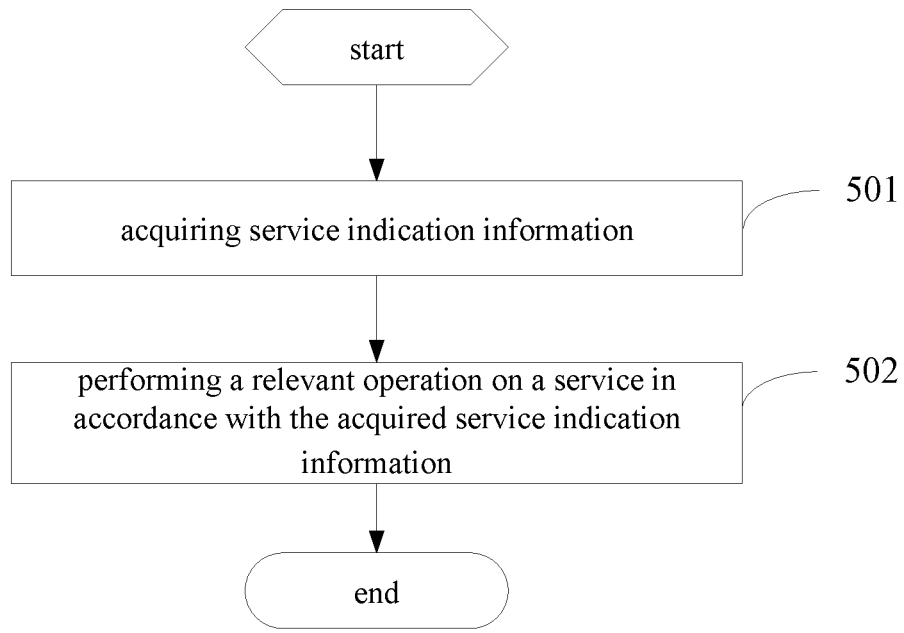
FIG. 5 is a flow chart of still yet another service indication method according to an embodiment of the present disclosure.

The present disclosure further provides in an embodiment a service indication method for a second network element which, as shown in FIG. 5, includes: Step 501 of acquiring service indication information, the service indication information including at least one of support information about a service, service operation information, and preference information about the service, the service including at least one of an emergency service and a voice service; and Step 502 of preforming a relevant operation on the service in accordance with the acquired service indication information.

The performing the relevant operation on the service may include, in accordance with the service indication information, accepting a PDU session or QoS flow establishment request for the service initiated by a terminal, handing over the terminal to an eLTE, handing over the terminal to an EPS or re-directing the terminal to an EPS, which will not be particularly defined herein.

Optionally, prior to acquiring the service indication information, the service indication method may further include transmitting service capability information about the second network element to a first network element, and the service capability information may be used to indicate whether the second network element supports the service.

Optionally, the support information about the service may include at least one of a service support indicator and service support type information.

Optionally, the service support indicator may be used to indicate whether the service is supported, or the service support indicator may be used to indicate at least one of whether the service is supported by an NR, whether the service is supported by an eLTE, and whether the service is supported by an EPS.

Optionally, the service support type information may be used to indicate support type for the service, or the service support type information may be used to indicate at least one of whether the service is supported by an NR, whether the service is supported by an eLTE, whether the service is supported by an EPS, whether the terminal is handed over to an EPS to support the service, and whether the terminal is re-directed to an EPS to support the service.

Optionally, the service indication information may further include indication information indicating whether the service is supported in a fallback mode.

Optionally, the service operation information may include at least one of indication information indicating that a PDU session for the service is to be accepted or a request for establishing a QoS flow is to be accepted, indication information indicating that the terminal is to be handed over to the eLTE, indication information indicating that the terminal is to be handed over to an EPS, and indication information indicating that the terminal is to be re-directed to an EPS. In an embodiment of the present disclosure, when the service support information includes the service support indicator (e.g., indicating whether the service is supported), the session operation information may include one of indication information indicating that the PDU session for the service is to be accepted, indication information indicating that the terminal is to be handed over to the eLTE, indication information indicating that the terminal is to be handed over to an EPS, and indication information indicating that the terminal is to be re-directed to an EPS. In another possible embodiment of the present disclosure, the service support information includes the indication information indicating that the service is supported in a fallback mode, the session operation information may include indication information indicating that the terminal is to be handed over to the eLTE, indication information indicating that the terminal is to be handed over to an EPS, and indication information indicating that the terminal is to be re-directed to an EPS.

Optionally, the service indication information may be a piece of service indication information at a location area, and a different piece of service indication information may correspond to a different location area respectively, i.e., the pieces of service indication information at different location areas (e.g., TAs) may be different.

Optionally, the performing the relevant operation on the service in accordance with the acquired service indication information may include receiving a request for establishing a PDU session or QoS flow for the service, and/or receiving the session operation information.

Optionally, when the second network element has received the request for establishing a PDU session or QoS flow for the service or has received the session operation information, the performing the relevant operation on the service in accordance with the acquired service indication information may include at least one of: when a first condition has been met, receiving the request for establishing a PDU session or QoS flow for the service, the first condition including at least one of a condition where the second network element is an NR base station and the service support indicator indicates that the service is supported by the NR, a condition where the second network element is an eLTE base station and the service support indicator indicates that the service is supported by the eLTE condition, and a condition where the session operation information indicates that the request for establishing a PDU session or QoS flow for the service is to be accepted; when a second condition has been met, handing over the terminal to the eLTE, the second condition including at least one of a condition where the second network element is the NR base station and the service support indicator indicates that the service is not supported by the NR condition and the service is supported by the eLTE condition, and a condition where the session operation information indicates that the terminal is to be handed over to the eLTE; when a third condition has been met, handing over the terminal to an EPS, the third condition including at least one of a condition where the second network element is an NR base station or an eLTE base station and the service support indicator indicates that the service is not supported by an NR and an eLTE and the terminal is supported to be handed over to an EPS to support the service, and a condition where the session operation information indicates that the terminal is to be handed over to an EPS; and when a fourth condition has been met, re-directing the terminal to an EPS, the fourth condition including at least one of a condition where the second network element is an NR base station or an eLTE base station and the service support indicator indicates that the service is not supported by an NR and an eLTE and the terminal is supported to be re-directed to an EPS to support the service, and a condition where the session operation information indicates that the terminal is to be re-directed to an EPS.

Optionally, when the second network element has received the session operation information, the performing the relevant operation on the service in accordance with the acquired service indication information may include at least one of: when the session operation information indicates that the terminal is to be handed over to the eLTE, handing over the terminal to the eLTE; when the session operation information indicates that the terminal is to be handed over to an EPS, handing over the terminal to an EPS; and when the session operation information indicates that the terminal is to be re-directed to an EPS, re-directing the terminal to an EPS.

It should be appreciated that, the implementation of the method in an embodiment of the present disclosure may refer to the relevant description about the second network element in FIG. 2 through FIG. 4 with a same beneficial effect, and thus will not be particularly defined herein.

Figure 6:
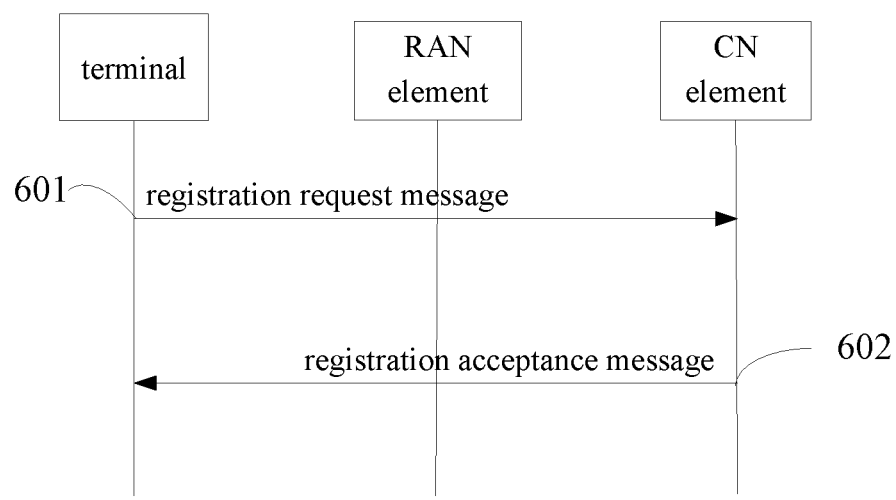
FIG. 6 is a schematic figure showing a service indication method according to an embodiment of the present disclosure.

The present disclosure further provides in an embodiment a service indication method which, as shown in FIG. 6, includes the following steps.

Step 601: transmitting, by a terminal, a registration request message to a core network element. In an embodiment of the present disclosure, the registration request message may include service capability information about the terminal.

Step 602: transmitting, by the core network element, a registration acceptance message to the terminal.

Upon the receipt of the registration request message, the core network element (e.g., an AMF), may determine at least one of support information about an emergency service, preference information about the emergency service, support information about a voice service, and preference information about the voice service. Next, the core network element (e.g., the AMF) may transmit the registration acceptance message to the terminal. In an embodiment of the present disclosure, the registration acceptance message may include at least one of the support information about the emergency service, the preference information about the emergency service, the support information about the voice service, and the preference information about the voice service.

It should be appreciated that, the support information about the emergency service, the preference information about the emergency service, the support information about the voice service, and the preference information about the voice service may refer to the description about the service indication information in the embodiments as shown in FIG. 2 through FIG. 5 with a same beneficial effect, and thus will not be particularly defined herein.

Figure 7:
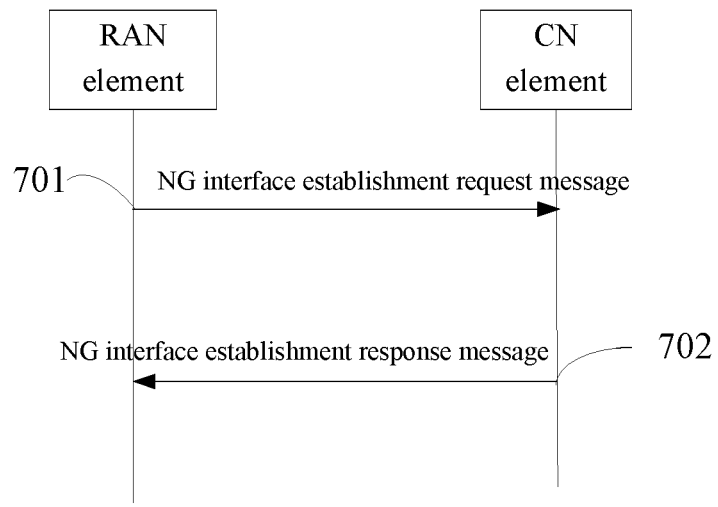
FIG. 7 is a schematic figure showing another service indication method according to an embodiment of the present disclosure.

The present disclosure further provides in an embodiment a service indication method which, as shown in FIG. 7, includes: Step 701 of transmitting, by an RAN element, an NG interface establishment request message to a core network element; and Step 702 of transmitting, by the core network element, an NG interface establishment response message to the RAN element. An NG interface may be an interface between the RAN element and the core network element.

The NG interface establishment request message may include a capability of the RAN element, e.g., at least one of support information about an emergency service and support information about a voice service.

The NG interface establishment response message may include a capability of the core network element, e.g., at least one of the support information about the emergency service and the support information about the voice service.

It should be appreciated that, the support information about the emergency service and the support information about the voice service may refer to the description about the service indication information in the embodiments as shown in FIG. 2 through FIG. 5 with a same beneficial effect, and thus will not be particularly defined herein.

Figure 8:
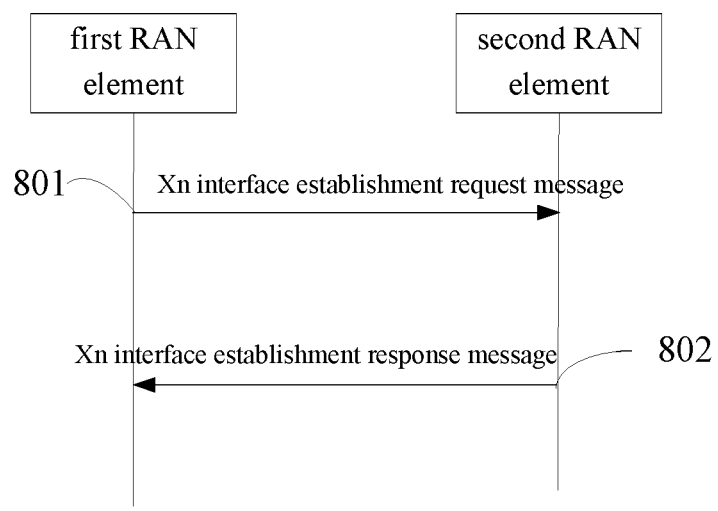
FIG. 8 is a schematic figure showing yet another service indication method according to an embodiment of the present disclosure.

The present disclosure further provides in an embodiment a service indication method which, as shown in FIG. 8, includes: Step 801 of transmitting, by a first RAN element, an Xn interface establishment request message to a second RAN element; and Step 802 of transmitting, by the second RAN element, an Xn interface establishment response message to the first RAN element. An Xn interface may be an interface between the first RAN element and the second RAN element.

The Xn interface establishment request message may include a capability of the first RAN element, e.g., at least one of support information about an emergency service and support information about a voice service.

The Xn interface establishment response message may include a capability of the second RAN element, e.g., at least one of the support information about the emergency service and the support information about the voice service.

It should be appreciated that, the support information about the emergency service and the support information about the voice service may refer to the description about the service indication information in the embodiments as shown in FIG. 2 through FIG. 5 with a same beneficial effect, and thus will not be particularly defined herein.

Figure 9:
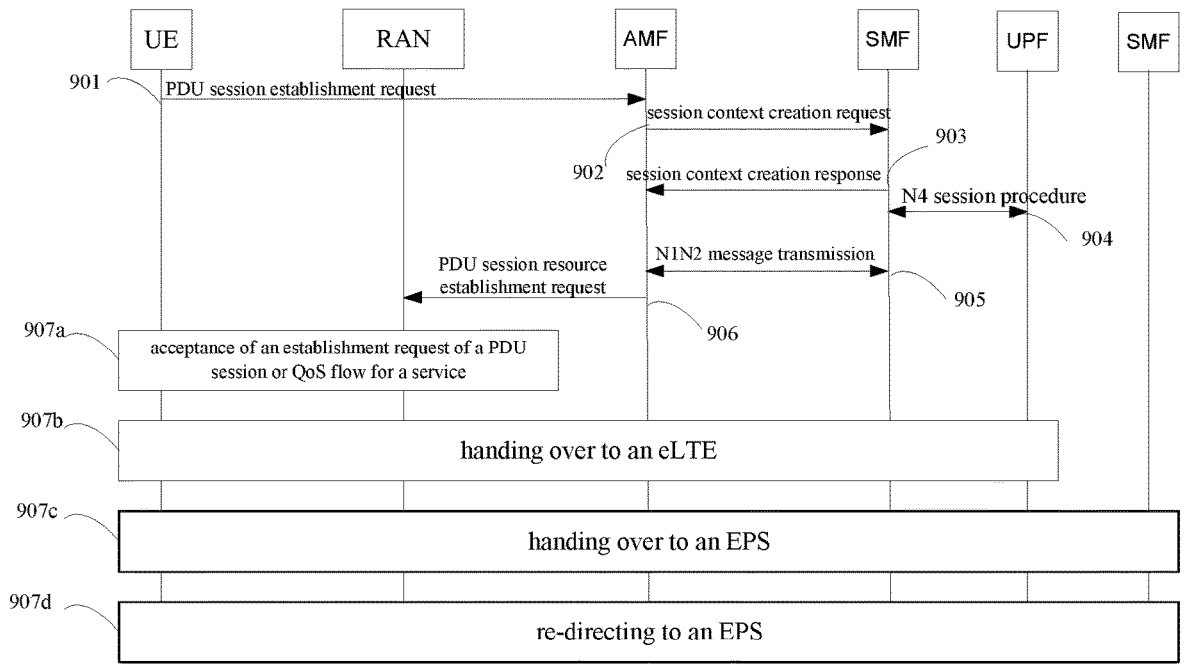
FIG. 9 is a schematic figure showing still yet another service indication method according to an embodiment of the present disclosure.

The present disclosure further provides in an embodiment a service indication method which, as shown in FIG. 9, includes the following steps.

Step 901: when a terminal needs to initiate an emergency service, transmitting, by the terminal, a PDU session establishment request message to an AMF in accordance with service indication information.

Step 902: transmitting, by the AMF, a session text creation request to an SMF.

Step 903: transmitting, by the SMF, a session text creation response to the AMF.

Step 904: performing an N4 session procedure between the SMF and a UPF.

Step 905: transmitting an N1/N2 message between the AMF and the SMF.

Steps 902 to 905 relate to a PDU session establishment procedure for a core network, which will not be particularly defined herein.

Step 906: transmitting, by the AMF, a PDU session resource establishment request message to the terminal. In an embodiment of the present disclosure, the PDU session resource establishment request message may include the service indication information.

In an embodiment of the present disclosure, an RAN may determine, in accordance with the service indication information, at least one of whether to accept an establishment request of a PDU session or QoS flow for the service, whether to switch the terminal to an eLTE, whether to switch the terminal to an EPS, and whether to re-direct the terminal to an EPS, which correspond to Steps 907a, 907b, 907c and 907d respectively.

Figure 10:
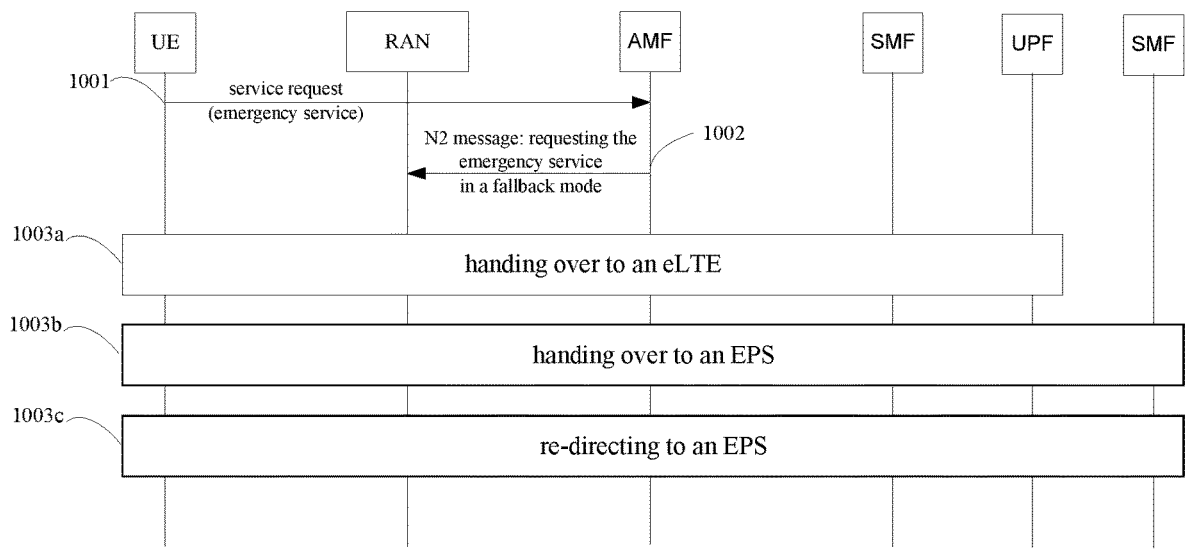
FIG. 10 is a schematic figure showing still yet another service indication method according to an embodiment of the present disclosure.

The present disclosure further provides in an embodiment a service indication method which, as shown in FIG. 10, includes the following steps.

Step 1001: when a terminal needs to initiate an emergency service, transmitting, by the terminal, a service request to an AMF in accordance with service indication information. A network may determine that the emergency service is to be supported in a fallback mode.

Step 1002: transmitting, by the AMF, the service indication information to an RAN. The service indication information may include service operation information, i.e., emergency service operation information, and it may be transmitted through an N2 message.

The RAN may determine, in accordance with the service indication information, at least one of whether to switch the terminal to an eLTE, whether to switch the terminal to an EPS, and whether to re-direct the terminal to an EPS, which correspond to Steps 1003a, 1003b and 1003c respectively.

Figure 11:
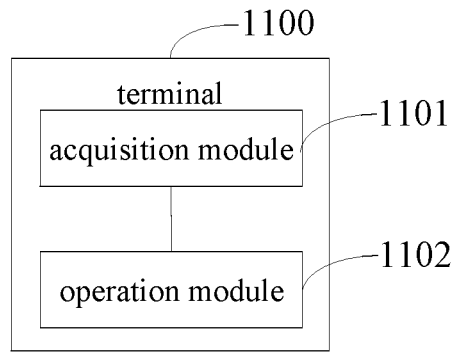
FIG. 11 is a structural figure showing a terminal according to an embodiment of the present disclosure.

The present disclosure further provides in an embodiment a terminal 1100 which, as shown in FIG. 11, includes: an acquisition module 1101 configured to acquire service indication information, the service indication information including at least one of support information about a service and preference information about the service, the service including at least one of an emergency service and a voice service; and an operation module 1102 configured to perform a relevant operation on the service in accordance with the acquired service indication information.

Figure 12:
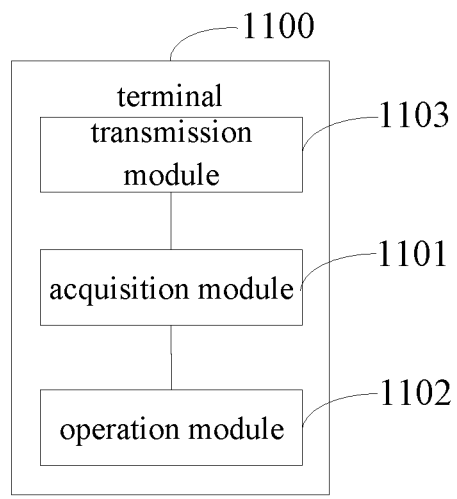
FIG. 12 is another structural figure showing the terminal according to an embodiment of the present disclosure.

Optionally, as shown in FIG. 12, the terminal 1100 may further include a transmission module 1103 configured to transmit service capability information about the terminal to a first network element, and the service capability information may be used to indicate whether the service is supported by the terminal.

Optionally, the support information about the service may include at least one of a service support indicator and service support type information.

Optionally, the service support indicator may be used to indicate whether the service is supported, or the service support indicator may be used to indicate at least one of whether the service is supported by an NR, whether the service is supported by an eLTE, and whether the service is supported by an EPS.

Optionally, whether the service is supported by the EPS may include at least one of whether the terminal is supported to be handed over to an EPS to support the service and whether the terminal is supported to be re-directed to an EPS to support the service.

Optionally, the service support type information may be used to indicate support type for the service, or the service support type information may be used to indicate at least one of whether the service is supported by an NR, whether the service is supported by an eLTE, whether the service is supported by an EPS, whether the terminal is handed over to an EPS to support the service, and whether the terminal is re-directed to an EPS to support the service.

Optionally, the service indication information may further include indication information indicating whether the service is supported in a fallback mode.

Optionally, the preference information about the service may include at least one of preference information indicating a preference of initiating PDU session establishment for the service, preference information indicating a preference of initiating a service request for the service, preference information indicating a preference of initiating PDU session establishment for the service preferentially and then initiating a service request for the service, and preference information indicating a preference of initiating a service request for the service preferentially and then initiating PDU session establishment for the service.

Optionally, the service indication information may be a piece of service indication information at a location area, and a different piece of service indication information may correspond to a different location area respectively, i.e., the pieces of service indication information at different location areas (e.g., TAs) may be different.

The terminal in an embodiment of the present disclosure is capable of implementing the procedures for the terminal in FIG. 2 and FIG. 3 to effectively perform the relevant operation on the service, which will thus not be particularly defined herein.

Figure 13:
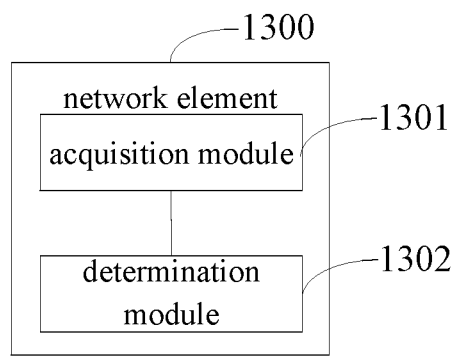
FIG. 13 is a structural figure showing a network element according to an embodiment of the present disclosure.

The present disclosure further provides in an embodiment a network element which is a first network element. As shown in FIG. 13, the network element 1300 includes: an acquisition module 1301 configured to acquire service capability information; and a determination module 1302 configured to determine service indication information in accordance with the acquired service capability information, the service indication information including at least one of support information about a service, service operation information, and preference information about the service, the service including at least one of an emergency service and a voice service.

Figure 14:
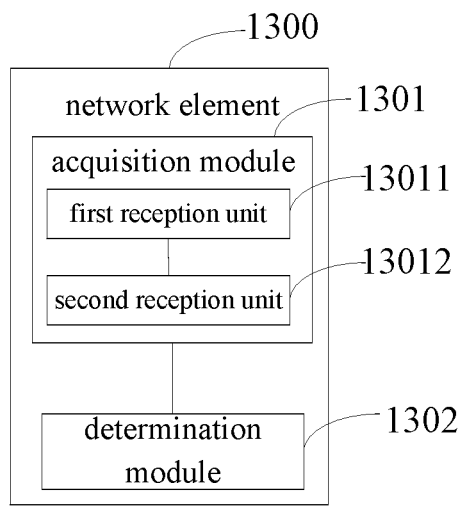
FIG. 14 is another structural figure showing the network element according to an embodiment of the present disclosure.

Optionally, as shown in FIG. 14, the acquisition module 1301 may include at least one of: a first reception unit 13011 configured to receive service capability information about a terminal from the terminal, the service capability information being used to indicate whether the service is supported by the terminal; and a second reception unit 13012 configured to receive service capability information about a second network element from the second network element, the service capability information being used to indicate whether the service is supported by the second network element.

Optionally, the service capability information about the terminal may include at least one of whether the service is supported in a non-fallback mode, whether the service is supported in a fallback mode, whether an EPS is to be supported, whether the terminal is supported to be handed over to an EPS, whether the terminal is supported to be re-directed to an EPS, whether PDU session establishment for the service is supported to be initiated, and whether a service request for the service is supported to be initiated; and/or the service capability information about the second network element may include at least one of whether the service is supported in a non-fallback mode, whether the service is supported in a fallback mode, whether the terminal is supported to be handed over to a network supporting the service, whether the terminal is supported to be handed over to an EPS, whether the terminal is supported to be re-directed to an EPS, and whether the service is supported directly.

Figure 15:
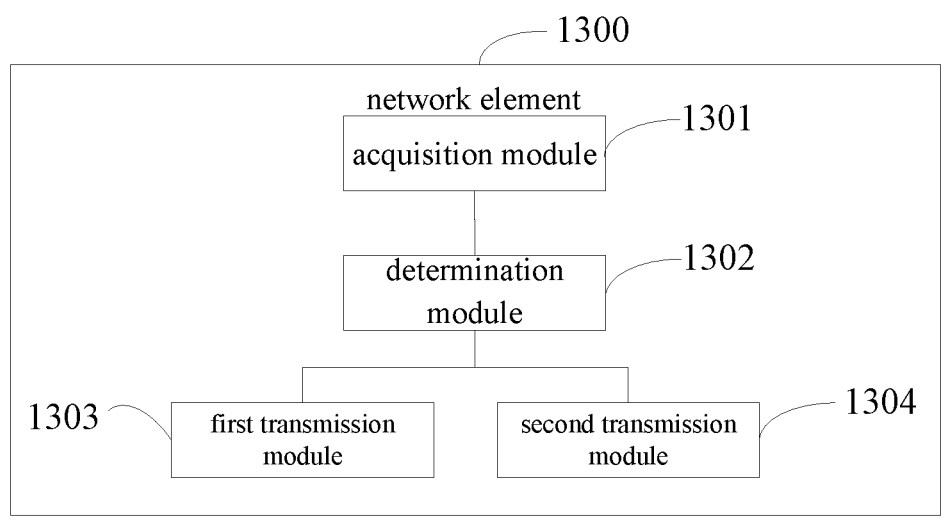
FIG. 15 is yet another structural figure showing the network element according to an embodiment of the present disclosure.

Optionally, as shown in FIG. 15, the network element 1300 may further include at least one of: a first transmission module 1303 configured to transmit the service indication information to the terminal; and a second transmission module 1304 configured to transmit the service indication information to the second network element.

Optionally, the support information about the service may include at least one of a service support indicator and service support type information.

Optionally, the service support indicator may be used to indicate whether the service is supported, or the service support indicator may be used to indicate at least one of whether the service is supported by an NR, whether the service is supported by an eLTE, and whether the service is supported by an EPS.

Optionally, whether the service is supported by the EPS may include at least one of whether the terminal is supported to be handed over to an EPS to support the service and whether the terminal is supported to be re-directed to an EPS to support the service.

Optionally, the service support type information may be used to indicate support type for the service, or the service support type information may be used to indicate at least one of whether the service is supported by an NR, whether the service is supported by an eLTE, whether the service is supported by an EPS, whether the terminal is handed over to an EPS to support the service, and whether the terminal is re-directed to an EPS to support the service.

Optionally, the service indication information may further include indication information indicating whether the service is supported in a fallback mode.

Optionally, the service operation information may include at least one of indication information indicating that a PDU session for the service is to be accepted or a request for establishing a QoS flow is to be accepted, indication information indicating that the terminal is to be handed over to the eLTE, indication information indicating that the terminal is to be handed over to an EPS, and indication information indicating that the terminal is to be re-directed to an EPS.

Optionally, when a predetermined condition has been met, the service indication information may include the preference information about the service.

Optionally, the predetermined condition may include at least one of a condition where the support information about the service indicates that the service is supported, and a condition where the support information about the service in a fallback mode indicates that the service is supported in a fallback mode.

Optionally, the preference information about the service may include at least one of preference information indicating a preference of initiating PDU session establishment for the service, preference information indicating a preference of initiating a service request for the service, preference information indicating a preference of initiating PDU session establishment for the service preferentially and then initiating a service request for the service, and preference information indicating a preference of initiating a service request for the service preferentially and then initiating PDU session establishment for the service.

Optionally, the service indication information may be a piece of service indication information at a location area, and a different piece of service indication information may correspond to a different location area respectively.

The network element in an embodiment of the present disclosure is capable of implementing the procedures for the first network element in FIG. 4 to enable the terminal to effectively perform the relevant operation on the service, which will not be particularly defined herein.

Figure 16:
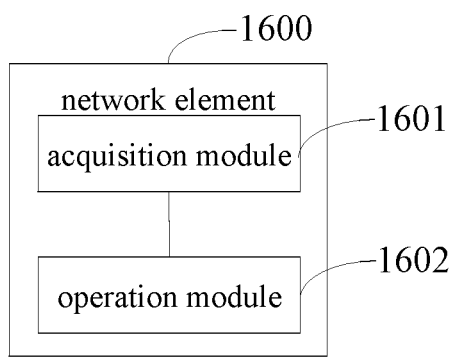
FIG. 16 is a structural figure showing a network element according to an embodiment of the present disclosure.

The present disclosure further provides in an embodiment a network element which is a second network element. As shown in FIG. 16, the network element 1600 includes: an acquisition module 1601 configured to acquire service indication information, the service indication information including at least one of support information about a service, service operation information, and preference information about the service, the service including at least one of an emergency service and a voice service; and an operation module 1602 configured to perform a relevant operation on the service in accordance with the acquired service indication information.

Figure 17:
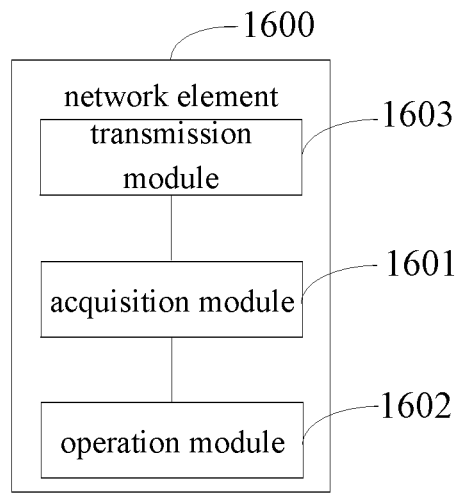
FIG. 17 is another structural figure showing the network element according to an embodiment of the present disclosure.

Optionally, as shown in FIG. 17, the network element 1600 may further include a transmission module 1603 configured to transmit service capability information about the second network element to a first network element, and the service capability information may be used to indicate whether the service is supported by the second network element.

Optionally, the support information about the service may include at least one of a service support indicator and service support type information.

Optionally, the service support indicator may be used to indicate whether the service is supported, or the service support indicator may be used to indicate at least one of whether the service is supported by an NR, whether the service is supported by an eLTE, and whether the service is supported by an EPS.

Optionally, the service support type information may be used to indicate support type for the service, or the service support type information may be used to indicate at least one of whether the service is supported by an NR, whether the service is supported by an eLTE, whether the service is supported by an EPS, whether the terminal is handed over to an EPS to support the service, and whether the terminal is re-directed to an EPS to support the service.

Optionally, the service indication information may further include indication information indicating whether the service is supported in a fallback mode.

Optionally, the service operation information may include at least one of indication information indicating that a PDU session for the service is to be accepted or a request for establishing a QoS flow is to be accepted, indication information indicating that the terminal is to be handed over to the eLTE, indication information indicating that the terminal is to be handed over to an EPS, and indication information indicating that the terminal is to be re-directed to an EPS.

Optionally, the service indication information may be a piece of service indication information at a location area, and a different piece of service indication information may correspond to a different location area respectively.

Optionally, the operation module 1602 is further configured to receive a request for establishing a PDU session or QoS flow for the service, and/or receive session operation information.

Optionally, when the second network element has received the request for establishing a PDU session or QoS flow for the service or has received the session operation information, the operation module 1602 is further configured to perform at least one of the following operations: when a first condition has been met, receiving the request for establishing a PDU session or QoS flow for the service, the first condition including at least one of a condition where the second network element is an NR base station and the service support indicator indicates that the service is supported by the NR, a condition where the second network element is an eLTE base station and the service support indicator indicates that the service is supported by the eLTE condition, and a condition where the session operation information indicates that the request for establishing a PDU session or QoS flow for the service is to be accepted; when a second condition has been met, handing over the terminal to the eLTE, the second condition including at least one of a condition where the second network element is the NR base station and the service support indicator indicates that the service is not supported by the NR condition and the service is supported by the eLTE condition, and a condition where the session operation information indicates that the terminal is to be handed over to the eLTE; when a third condition has been met, handing over the terminal to an EPS, the third condition including at least one of a condition where the second network element is an NR base station or an eLTE base station and the service support indicator indicates that the service is not supported by an NR and an eLTE and the terminal is supported to be handed over to an EPS to support the service, and a condition where the session operation information indicates that the terminal is to be handed over to an EPS; and when a fourth condition has been met, re-directing the terminal to an EPS, the fourth condition including at least one of a condition where the second network element is an NR base station or an eLTE base station and the service support indicator indicates that the service is not supported by an NR and an eLTE and the terminal is supported to be re-directed to an EPS to support the service, and a condition where the session operation information indicates that the terminal is to be re-directed to an EPS.

Optionally, the operation module 1602 is further configured to perform the relevant operation on the service indicated by the service operation information in accordance with the service operation information.

The network element in an embodiment of the present disclosure is capable of implementing the procedures for the second network element in FIG. 5 to enable the terminal to effectively perform the relevant operation on the service, which will thus not be particularly defined herein.

Figure 18:
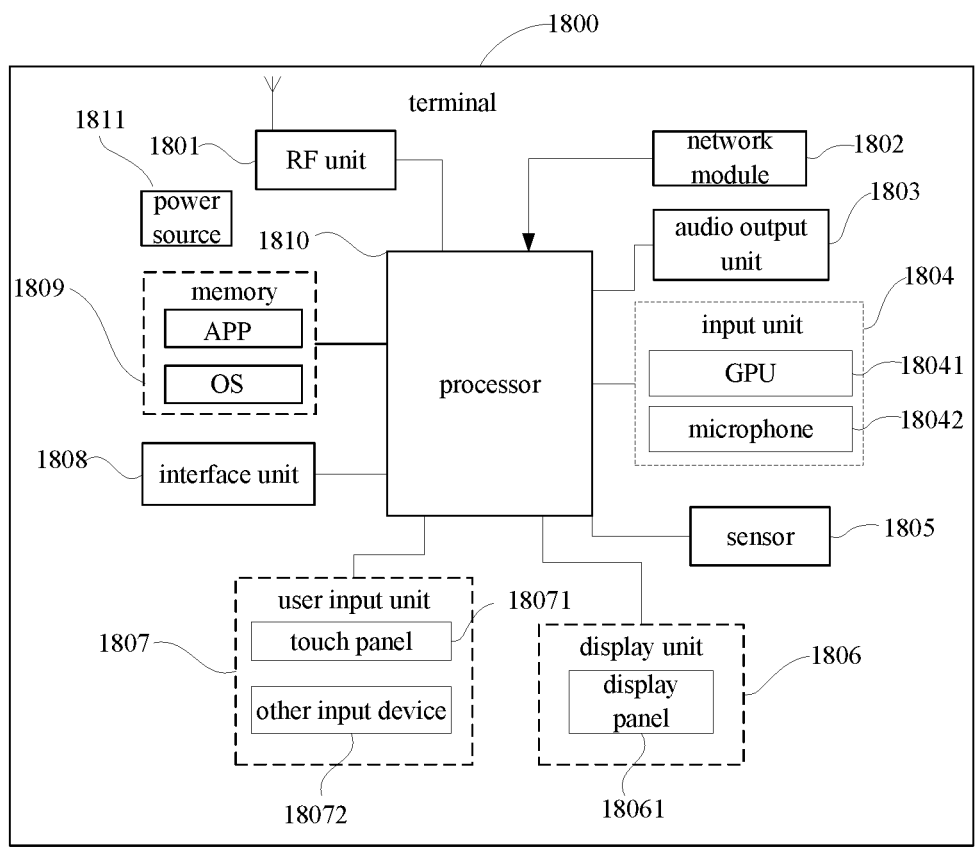
FIG. 18 is a structural figure showing the terminal according to an embodiment of the present disclosure.

FIG. 18 shows a hardware structure of a terminal according to an embodiment of the present disclosure. As shown in FIG. 18, the terminal 1800 may include, but not limited to, a radio frequency (Radio Frequency, RF) unit 1801, a network module 1802, an audio output unit 1803, an input unit 1804, a sensor 1805, a display unit 1806, a user input unit 1807, an interface unit 1808, a memory 1809, a processor 1810, and a power source 1811. It should be appreciated that, the structure in FIG. 18 shall not be construed as limiting the UE. The UE may include more or fewer members, or some members may be combined, or the UE may include some other members not shown in FIG. 18. In an embodiment of the present disclosure, the UE may include, but not limited to, mobile phone, flat-panel computer, laptop computer, personal digital assistant (Personal Digital Assistant, PDA), vehicle-mounted terminal, wearable device or pedometer.

The RF unit 1801 is configured to: acquire service indication information, the service indication information including at least one of support information about a service and preference information about the service, the service including at least one of an emergency service and a voice service; and perform a relevant operation on the service in accordance with the acquired service indication information.

Optionally, prior to acquiring the service indication information, the RF unit 1801 is further configured to transmit service capability information about the terminal to a first network element, and the service capability information may be used to indicate whether the service is supported by the terminal.

Optionally, the support information about the service may include at least one of a service support indicator and service support type information.

Optionally, the service support indicator may be used to indicate whether the service is supported, or the service support indicator may be used to indicate at least one of whether the service is supported by an NR, whether the service is supported by an eLTE, and whether the service is supported by an EPS.

Optionally, whether the service is supported by the EPS may include at least one of whether the terminal is supported to be handed over to an EPS to support the service and whether the terminal is supported to be re-directed to an EPS to support the service.

Optionally, the service support type information may be used to indicate support type for the service, or the service support type information may be used to indicate at least one of whether the service is supported by an NR, whether the service is supported by an eLTE, whether the service is supported by an EPS, whether the terminal is handed over to an EPS to support the service, and whether the terminal is re-directed to an EPS to support the service.

Optionally, the service indication information may further include indication information indicating whether the service is supported in a fallback mode.

Optionally, the preference information about the service may include at least one of preference information indicating a preference of initiating PDU session establishment for the service, preference information indicating a preference of initiating a service request for the service, preference information indicating a preference of initiating PDU session establishment for the service preferentially and then initiating a service request for the service, and preference information indicating a preference of initiating a service request for the service preferentially and then initiating PDU session establishment for the service.

Optionally, the service indication information may be a piece of service indication information at a location area, and a different piece of service indication information may correspond to a different location area.

The terminal 1800 may perform the relevant operation on the service effectively.

It should be appreciated that, in an embodiment of the present disclosure, the RF unit 1801 is configured to transmit and receive signals during the information transmission or phone call. To be specific, the RF unit 1801 may, upon the receipt of downlink data from a base station, transmit the downlink data to the processor 1810 for subsequent treatment. In addition, the RF unit 1801 may transmit uplink data to the base station. Usually, the RF unit 1801 may include, but not limited to, an antenna, at least one amplifier, a transceiver, a coupler, a low-noise amplifier and a duplexer. In addition, the RF unit 1801 may communicate with a network and the other devices via a wireless communications system.

The network module 1802 is configured to enable the terminal to access the broadband Internet in a wireless manner, e.g., help a user to receive and send an e-mail, browse a web page or access a streaming media.

The audio output unit 1803 is configured to convert audio data received by the RF unit 1801 or the network module 1802, or audio data stored in the memory 1809, into an audio signal and output the audio signal as a sound. In addition, the audio output unit 1803 is further configured to provide an audio output related to a specific function executed by the terminal 1800 (e.g., a sound occurring when a calling signal or a message has been received). The audio output unit 1803 may include a loudspeaker, a buzzer and a receiver.

The input unit 1804 is configured to receive an audio or video signal. It may include a graphics processing unit (Graphics Processing Unit, GPU) 18041 and a microphone 18042. The GPU 18041 is configured to process image data of a static image or video acquired by an image collection unit (e.g., a camera) in a video capturing mode or an image capturing mode, and a processed image frame may be displayed by the display unit 1806. The image frame processed by the GPU 18041 may be stored in the memory 1809 (or any other storage medium) or transmitted via the RF unit 1801 or network module 1802. The microphone 18042 is configured to receive a sound, and convert the sound into voice data. In a call mode, the processed audio data may be converted into data in a format capable of being transmitted by the RF unit 1801 to a mobile communications base station.

The at least one sensor 1805 may include a light sensor, a movement sensor and the other sensors. To be specific, the light sensor may include an ambient light sensor or a proximity sensor. The ambient light sensor is configured to adjust a brightness value of a display panel 18061 in accordance with ambient light. The proximity sensor is configured to turn off the display panel 1661 and/or a backlight source when the terminal 1800 moves close to an ear. As one of the movement sensors, an accelerometer may detect acceleration in various directions (usually a three-axis accelerometer), and detect a level and a direction of a gravity force in a static state. Through the accelerometer, it is able to identify a posture of the terminal (e.g., perform a handing over operation between portrait and landscape orientations, play relevant games, and calibrate a posture of a magnetometer), and perform vibration-related functions (e.g., count steps and strikes). The sensor 1805 may further include a fingerprint sensor, a pressure sensor, an iris sensor, a molecule sensor, a gyroscope, a barometer, a hygrometer, a thermometer or an infrared sensor, which will not be particularly defined herein.

The display unit 1806 is configured to display information inputted by the user or provided to the user. The display unit 1806 may include the display panel 18061, e.g., a liquid crystal display (Liquid Crystal Display, LCD) panel, or an organic light-emitting diode (Organic Light-Emitting Diode, OLED) panel.

The user input unit 1807 is configured to receive digital or character information inputted by the user, and generate a key signal input related to user settings and function control of the terminal. To be specific, the user input unit 1807 may include a touch panel 18071 and an input device 18072. The touch panel 18071, also called as touch screen, is configured to collect a touch operation made by the user on or in proximity to the touch panel (e.g., an operation made by the user through any appropriate object or attachment (e.g., finger or stylus) on or in the proximity to the touch panel 18071). The touch panel 18071 may include a touch detection unit and a touch controller. The touch detection unit is configured to detect a touch position and a signal generated due to the touch operation, and to transmit the signal to the touch controller. The touch controller is configured to receive touch information from the touch detection unit, convert it into coordinates of a touch point, transmit the coordinates to the processor 1810, and receive and execute a command from the processor 1810. In addition, the touch panel 18071 may be of a resistive type, a capacitive type, an infrared type or a surface acoustic wave (SAW) type. The other input device 18072 may include, but not limited to, a physical keyboard, a functional button (e.g., a volume control button or an on/off button), a trackball, a mouse, and a joystick, which will not be particularly defined herein.

Further, the touch panel 18071 may cover the display panel 18061. When the touch operation made on or in proximity to the touch panel 18071 has been detected, the touch panel 18071 may transmit the touch information to the processor 1810, so as to determine a type of a touch event. Then, the processor 1810 may control the display panel 18061 to provide a corresponding visual output in accordance with the type of the touch event. Although the touch panel 18071 and the display panel 18061 are configured as two separate members in FIG. 18, in an embodiment of the present disclosure, they may be integrated so as to achieve the input and output functions of the electronic device, which will not be particularly defined herein.

The interface unit 1808 is configured to provide an interface between an external device and the terminal 1800. For example, the external device may include a wired or wireless headset port, an external power source port (or a charging port), a wired or wireless data port, a memory card port, a port for a device having an identification module, an audio input/output (I/O) port, a video I/O port, and an earphone port. The interface unit 1808 is configured to receive an input from the external device (e.g., data information and electricity) and transmit the input to one or more elements of the terminal 1800, or transmit data between the terminal 1800 and the external device.

The memory 1809 is configured to store therein a software application and various data. It may mainly include an application storage area and a data storage area. An operating system and at least one application for the functions (e.g., an audio/image playing function) may be stored in the application storage area. Data created in accordance with the operation of the mobile phone (e.g., audio data and textbook) may be stored in the data storage area. In addition, the memory 1809 may include a high-speed random access memory (Random Access Memory, RAM), or a non-volatile memory (e.g., at least one magnetic disk or flash memory), or any other volatile solid state memory.

As a control center of the electronic device, the processor 1810 may be connected to the other members of the electronic device via various interfaces and circuits, and configured to run or execute the software program and/or module stored in the memory 1809, and call the data stored in the memory 1809, so as to execute the functions of the electronic device and process the data, thereby to monitor the entire electronic device. The processor 1810 may include one or more processing units. In an embodiment of the present disclosure, an application processor and a modem may be integrated into the processor 1810. The application processor is mainly configured to process the operating system, a user interface and the application. The modem is mainly configured to process wireless communications. It should be appreciated that, the modem may also not be integrated into the processor 1810.

The power source 1811 (e.g., a battery) is configured to supply power to the members of the terminal 1800. In an embodiment of the present disclosure, the power source 1811 is logically connected to the processor 1810 via a power source management system, so as to achieve such functions as charging, discharging and power consumption management through the power source management system.

In addition, the terminal 1800 may include some functional modules not shown in FIG. 18, which will not be particularly defined herein.

The present disclosure further provides in an embodiment a terminal, which includes a processor 1810, a memory 1809, and a computer program stored in the memory 1809 and executed by the processor 1810. The processor 1810 is configured to execute the computer program so as to implement the above service indication method with a same technical effect, which will not be particularly defined herein.

Figure 19:
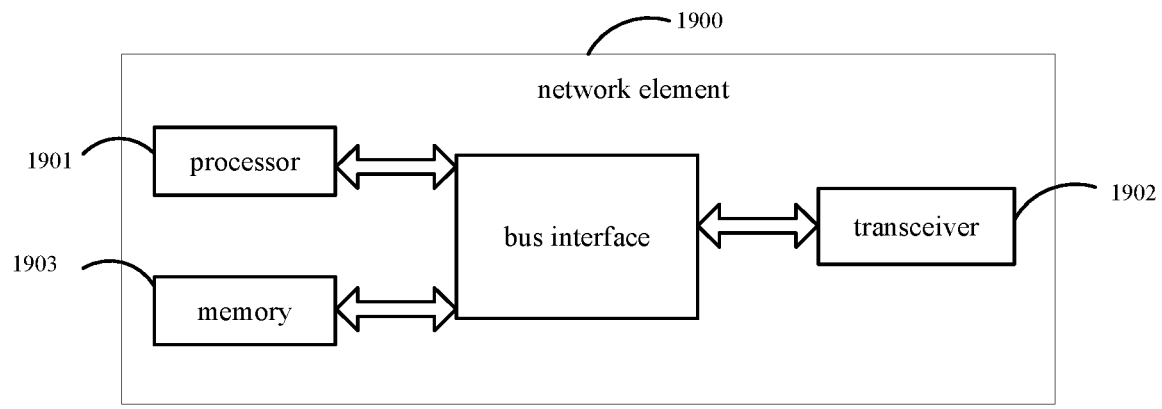
FIG. 19 is a structural figure showing the network element according to an embodiment of the present disclosure.

The present disclosure further provides in an embodiment an available network element which is a first network element. As shown in FIG. 19, the network element 1900 includes a processor 1901, a transceiver 1902, a memory 1903 and a bus interface. The transceiver 1902 is configured to acquire service capability information. The processor 1901 is configured to determine service indication information in accordance with the acquired service capability information. The service indication information may include at least one of support information about a service, service operation information, and preference information about the service, the service may include at least one of an emergency service and a voice service.

Optionally, during the acquisition of the service capability information, the transceiver 1902 is configured to perform at least one of the following operations: receiving service capability information about a terminal from the terminal, the service capability information being used to indicate whether the service is supported by the terminal; and receiving service capability information about a second network element from the second network element, the service capability information being used to indicate whether the service is supported by the second network element.

Optionally, the service capability information about the terminal may include at least one of whether the service is supported in a non-fallback mode, whether the service is supported in a fallback mode, whether an EPS is to be supported, whether the terminal is supported to be handed over to an EPS, whether the terminal is supported to be re-directed to an EPS, whether PDU session establishment for the service is supported to be initiated, and whether a service request for the service is supported to be initiated; and/or the service capability information about the second network element may include at least one of whether the service is supported in a non-fallback mode, whether the service is supported in a fallback mode, whether the terminal is supported to be handed over to a network supporting the service, whether the terminal is supported to be handed over to an EPS, whether the terminal is supported to be re-directed to an EPS, and whether the service is supported directly.

Optionally, subsequent to determining the service indication information, the transceiver 1902 is further configured to perform at least one of the following operations: transmitting the service indication information to the terminal; and transmitting the service indication information to the second network element.

Optionally, the support information about the service may include at least one of a service support indicator and service support type information.

Optionally, the service support indicator may be used to indicate whether the service is supported, or the service support indicator may be used to indicate at least one of whether the service is supported by an NR, whether the service is supported by an eLTE, and whether the service is supported by an EPS.

Optionally, whether the service is supported by the EPS may include at least one of whether the terminal is supported to be handed over to an EPS to support the service and whether the terminal is supported to be re-directed to an EPS to support the service.

Optionally, the service support type information may be used to indicate support type for the service, or the service support type information may be used to indicate at least one of whether the service is supported by an NR, whether the service is supported by an eLTE, whether the service is supported by an EPS, whether the terminal is handed over to an EPS to support the service, and whether the terminal is re-directed to an EPS to support the service.

Optionally, the service indication information may further include indication information indicating whether the service is supported in a fallback mode.

Optionally, the service operation information may include at least one of indication information indicating that a PDU session for the service is to be accepted or a request for establishing a QoS flow is to be accepted, indication information indicating that the terminal is to be handed over to the eLTE, indication information indicating that the terminal is to be handed over to an EPS, and indication information indicating that the terminal is to be re-directed to an EPS.

Optionally, when a predetermined condition has been met, the service indication information may include the preference information about the service, and the preference information about the service may include at least one of preference information about the emergency service, and preference information about the voice service. Optionally, the predetermined condition may include at least one of a condition where the support information about the service indicates that the service is supported, and a condition where the support information about the service in a fallback mode indicates that the service is supported in a fallback mode.

Optionally, the preference information about the service may include at least one of preference information indicating a preference of initiating PDU session establishment for the service, preference information indicating a preference of initiating a service request for the service, preference information indicating a preference of initiating PDU session establishment for the service preferentially and then initiating a service request for the service, and preference information indicating a preference of initiating a service request for the service preferentially and then initiating PDU session establishment for the service.

Optionally, the service indication information may be a piece of service indication information at a location area, and a different piece of service indication information may correspond to a different location area.

Through the network element 1900, it is able for the terminal to initiate the service effectively.

The transceiver 1902 is configured to receive and transmit data under the control of the processor 1901, and it may include at least two antenna ports.

In FIG. 19, bus architecture may include a number of buses and bridges connected to each other, so as to connect various circuits for one or more processors 1901 and one or more memories 1903. In addition, as is known in the art, the bus architecture may be used to connect any other circuits, such as a circuit for a peripheral device, a circuit for a voltage stabilizer and a power management circuit. The bus interface may be provided, and the transceiver 1902 may consist of a plurality of elements, i.e., a transmitter and a receiver for communication with any other devices over a transmission medium. With respect to different UEs, a user interface 1904 may also be provided for devices which are to be arranged inside or outside the UE, and these devices may include but not limited to a keypad, a display, a speaker, a microphone and a joystick. The processor 1901 may take charge of managing the bus architecture as well as general processings. The memory 1903 may store therein data for the operation of the processor 1901.

The present disclosure further provides in an embodiment a network element which includes a processor 1901, a memory 1903, and a computer program stored in the memory 1903 and executed by the processor 1901. The processor 1901 is configured to execute the computer program so as to implement the above-mentioned service indication method with a same technical effect, which will not be particularly defined herein.

Figure 20:
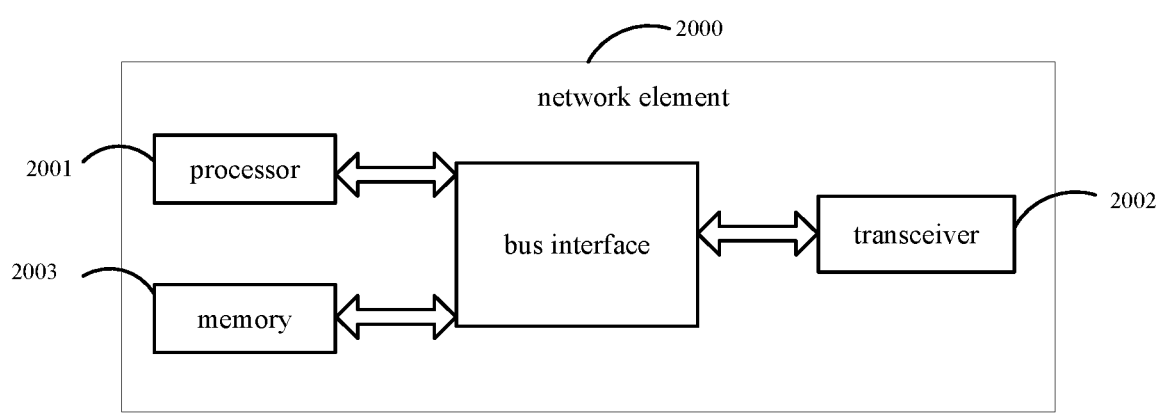
FIG. 20 is a structural figure showing the network element according to an embodiment of the present disclosure.

The present disclosure further provides in an embodiment an available network element which is a second network element. As shown in FIG. 20, the network element 2000 may include a processor 2001, a transceiver 2002, a memory 2003 and a bus interface. The transceiver 2002 is configured to: acquire service indication information, the service indication information including at least one of support information about a service, service operation information, and preference information about the service, the service including at least one of an emergency service and a voice service; and perform a relevant operation on the service in accordance with the acquired service indication information.

Optionally, prior to acquiring the service indication information, the transceiver 2002 is further configured to transmit service capability information about the second network element to a first network element, and the service capability information may be used to indicate whether the service is supported by the second network element.

Optionally, the support information about the service may include at least one of a service support indicator and service support type information.

Optionally, the service support indicator may be used to indicate whether the service is supported, or the service support indicator may be used to indicate at least one of whether the service is supported by an NR, whether the service is supported by an eLTE, and whether the service is supported by an EPS.

Optionally, the service support type information may be used to indicate support type for the service, or the service support type information may be used to indicate at least one of whether the service is supported by an NR, whether the service is supported by an eLTE, whether the service is supported by an EPS, whether the terminal is handed over to an EPS to support the service, and whether the terminal is re-directed to an EPS to support the service.

Optionally, the service indication information may further include indication information indicating whether the service is supported in a fallback mode.

Optionally, the service operation information may include at least one of indication information indicating that a PDU session for the service is to be accepted or a request for establishing a QoS flow is to be accepted, indication information indicating that the terminal is to be handed over to the eLTE, indication information indicating that the terminal is to be handed over to an EPS, and indication information indicating that the terminal is to be re-directed to an EPS.

Optionally, the service indication information may be a piece of service indication information at a location area, and a different piece of service indication information may correspond to a different location area.

Optionally, the transceiver 2002 is further configured to receive a request for establishing a PDU session or QoS flow for the service, and/or receive session operation information.

Optionally, when the second network element has received the request for establishing a PDU session or QoS flow for the service or has received the session operation information, the transceiver 2002 is further configured to perform at least one of the following operations: when a first condition has been met, receiving the request for establishing a PDU session or QoS flow for the service, the first condition including at least one of a condition where the second network element is an NR base station and the service support indicator indicates that the service is supported by the NR, a condition where the second network element is an eLTE base station and the service support indicator indicates that the service is supported by the eLTE condition, and a condition where the session operation information indicates that the request for establishing a PDU session or QoS flow for the service is to be accepted; when a second condition has been met, handing over the terminal to the eLTE, the second condition including at least one of a condition where the second network element is the NR base station and the service support indicator indicates that the service is not supported by the NR condition and the service is supported by the eLTE condition, and a condition where the session operation information indicates that the terminal is to be handed over to the eLTE; when a third condition has been met, handing over the terminal to an EPS, the third condition including at least one of a condition where the second network element is an NR base station or an eLTE base station and the service support indicator indicates that the service is not supported by an NR and an eLTE and the terminal is supported to be handed over to an EPS to support the service, and a condition where the session operation information indicates that the terminal is to be handed over to an EPS; and when a fourth condition has been met, re-directing the terminal to an EPS, the fourth condition including at least one of a condition where the second network element is an NR base station or an eLTE base station and the service support indicator indicates that the service is not supported by an NR and an eLTE and the terminal is supported to be re-directed to an EPS to support the service, and a condition where the session operation information indicates that the terminal is to be re-directed to an EPS.

Through the network element 2000, it is able for the terminal to initiate the service effectively.

The transceiver 2002 is configured to receive and transmit data under the control of the processor 2001, and it may include at least two antenna ports.

In FIG. 20, bus architecture may include a number of buses and bridges connected to each other, so as to connect various circuits for one or more processors 2001 and one or more memories 2003. In addition, as is known in the art, the bus architecture may be used to connect any other circuits, such as a circuit for a peripheral device, a circuit for a voltage stabilizer and a power management circuit. The bus interface may be provided, and the transceiver 2002 may consist of a plurality of elements, i.e., a transmitter and a receiver for communication with any other devices over a transmission medium. With respect to different UEs, a user interface 2004 may also be provided for devices which are to be arranged inside or outside the UE, and these devices may include but not limited to a keypad, a display, a speaker, a microphone and a joystick. The processor 2001 may take charge of managing the bus architecture as well as general processings. The memory 2003 may store therein data for the operation of the processor 2001.

The present disclosure further provides in an embodiment a network element which includes a processor 2001, a memory 2003, and a computer program stored in the memory 2003 and executed by the processor 2001. The processor 2001 is configured to execute the computer program so as to implement the above-mentioned service indication method with a same technical effect, which will not be particularly defined herein.

The present disclosure further provides in an embodiment a computer-readable storage medium storing therein a computer program. The computer program is executed by a processor, so as to implement the above-mentioned service indication method for the terminal, or implement the above-mentioned service indication method for the first network element, or implement the service indication method for the second network element. The computer-readable storage medium may be an ROM, an RAM, a magnetic disk or an optical disk.

It should be appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include several instructions so as to enable a terminal device (mobile phone, computer, server, air conditioner or network device) to execute the methods in embodiments of the present disclosure.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A non-transitory computer-readable storage medium storing therein a computer program, wherein the computer program is executed by a processor of a Radio Access Network (RAN) so as to implement a service indication method, the service indication method comprising:

acquiring service indication information from an Access and Mobility Management Function (AMF), the service indication information comprising support information about the service, the service comprising at least one of an emergency service or a voice service; and preforming a relevant operation on the service in accordance with the acquired service indication information and a Packet Data Unit (PDU) session or a Quality of Service (QoS) flow establishment request for the service, wherein the support information about the service comprises service support type information;

wherein the service support type information is used to indicate whether redirection to Evolved Packet System (EPS) for supporting the service is possible or not, wherein in a first situation where the service support type information is used to indicate redirection to EPS for supporting the service is possible, the performing the relevant operation on the service in accordance with the service indication information comprises choosing one operation among the following operations:

accepting a PDU session or QoS flow establishment request for the service, handing over the terminal to an enhanced Long Term Evolution (eLTE), handing over the terminal to an EPS, or re-directing the terminal to an EPS, or in a second situation where the service support type information is used to indicate redirection to EPS for supporting the service is not possible, the performing the relevant operation on the service in accordance with the service indication information comprises choosing one operation among the following operations: accepting a PDU session or QoS flow establishment request for the service, handing over the terminal to an enhanced Long Term Evolution (eLTE), or handing over the terminal to an EPS.

2. The non-transitory computer-readable storage medium according to claim 1, wherein the support information about the service further comprises a service support indicator;

wherein the service support indicator is used to indicate whether the service is supported, or the service support indicator is used to indicate at least one of whether the service is supported by an NR, whether the service is supported by an eLTE, or whether the service is supported by an EPS.

3. The non-transitory computer-readable storage medium according to claim 1, wherein prior to acquiring the service indication information, the service indication method further comprises:

transmitting service capability information about the RAN to the AMF, and the service capability information is used to indicate whether the service is supported by the RAN.

4. The non-transitory computer-readable storage medium according to claim 1, wherein the service indication information further comprises indication information indicating whether the service is supported in a fallback method.

5. The non-transitory computer-readable storage medium according to claim 1, wherein the service indication information is a piece of service indication information at a location area, and a different piece of service indication information corresponds to a different location area.

6. The non-transitory computer-readable storage medium according to claim 1, wherein the performing the relevant operation on the service in accordance with the acquired service indication information comprises:

receiving a request for establishing a PDU session or QoS flow for the service, and/or receiving session operation information.

7. The non-transitory computer-readable storage medium according to claim 6, wherein when the RAN has received the request for establishing a PDU session or QoS flow for the service or has received the session operation information, the performing the relevant operation on the service in accordance with the acquired service indication information comprises at least one of:

when a first condition has been met, receiving the request for establishing a PDU session or QoS flow for the service, the first condition comprising at least one of a condition where the RAN is an NR base station and the service support indicator indicates that the service is supported by the NR, a condition where the RAN is an eLTE base station and the service support indicator indicates that the service is supported by the eLTE condition, or a condition where the session operation information indicates that the request for establishing a PDU session or QoS flow for the service is to be accepted;

when a second condition has been met, handing over the terminal to the eLTE, the second condition comprising at least one of a condition where the RAN is the NR base station and the service support indicator indicates that the service is not supported by the NR but the service is supported by the eLTE, or a condition where the session operation information indicates that the terminal is to be handed over to the eLTE;

when a third condition has been met, handing over the terminal to an EPS, the third condition comprising at least one of a condition where the RAN is an NR base station or an eLTE base station and the service support indicator indicates that the service is not supported by an NR or an eLTE but the terminal is supported to be handed over to an EPS to support the service, or a condition where the session operation information indicates that the terminal is to be handed over to an EPS; or when a fourth condition has been met, re-directing the terminal to an EPS, the fourth condition comprising at least one of a condition where the RAN is an NR base station or an eLTE base station and the service support indicator indicates that the service is not supported by an NR or an eLTE but the terminal is supported to be re-directed to an EPS to support the service, or a condition where the session operation information indicates that the terminal is to be re-directed to an EPS.

8. A service indication method performed by a Radio Access Network (RAN), the service indication method comprising:
  acquiring service indication information from an Access and Mobility Management Function (AMF), the service indication information comprising support information about the service, the service comprising at least one of an emergency service or a voice service; and
  preforming a relevant operation on the service in accordance with the acquired service indication information and a PDU session or a QoS flow establishment request for the service,
  wherein the support information about the service comprises service support type information;
  wherein the service support type information is used to indicate whether redirection to Evolved Packet System (EPS) for supporting the service is possible or not, wherein
    in a first situation where the service support type information is used to indicate redirection to EPS for supporting the service is possible, the performing the relevant operation on the service in accordance with the service indication information comprises choosing one operation among the following operations: accepting a PDU session or QoS flow establishment request for the service, handing over the terminal to an enhanced Long Term Evolution (eLTE), handing over the terminal to an EPS, or re-directing the terminal to an EPS, or
    in a second situation where the service support type information is used to indicate redirection to EPS for supporting the service is not possible, the performing the relevant operation on the service in accordance with the service indication information comprises choosing one operation among the following operations: accepting a PDU session or QoS flow establishment request for the service, handing over the terminal to an enhanced Long Term Evolution (eLTE), or handing over the terminal to an EPS.

9. The service indication method according to claim 8, wherein the support information about the service further comprises a service support indicator;
  wherein the service support indicator is used to indicate whether the service is supported, or the service support indicator is used to indicate at least one of whether the service is supported by an NR, whether the service is supported by an eLTE, or whether the service is supported by an EPS.

10. The service indication method according to claim 8, wherein prior to acquiring the service indication information, the service indication method further comprises:
  transmitting service capability information about the RAN to the AMF, and the service capability information is used to indicate whether the service is supported by the RAN.

11. The service indication method according to claim 8, wherein the service indication information further comprises indication information indicating whether the service is supported in a fallback method.

12. The service indication method according to claim 8, wherein the service indication information is a piece of service indication information at a location area, and a different piece of service indication information corresponds to a different location area.

13. The service indication method according to claim 8, wherein the performing the relevant operation on the service in accordance with the acquired service indication information comprises:
  receiving a request for establishing a PDU session or QoS flow for the service, and/or
  receiving session operation information.

14. The service indication method according to claim 13, wherein when the RAN has received the request for establishing a PDU session or QoS flow for the service or has received the session operation information, the performing the relevant operation on the service in accordance with the acquired service indication information comprises at least one of:
  when a first condition has been met, receiving the request for establishing a PDU session or QoS flow for the service, the first condition comprising at least one of a condition where the RAN is an NR base station and the service support indicator indicates that the service is supported by the NR, a condition where the RAN is an eLTE base station and the service support indicator indicates that the service is supported by the eLTE condition, or a condition where the session operation information indicates that the request for establishing a PDU session or QoS flow for the service is to be accepted;
  when a second condition has been met, handing over the terminal to the eLTE, the second condition comprising at least one of a condition where the RAN is the NR base station and the service support indicator indicates that the service is not supported by the NR but the service is supported by the eLTE, or a condition where the session operation information indicates that the terminal is to be handed over to the eLTE;
  when a third condition has been met, handing over the terminal to an EPS, the third condition comprising at least one of a condition where the RAN is an NR base station or an eLTE base station and the service support indicator indicates that the service is not supported by an NR or an eLTE but the terminal is supported to be handed over to an EPS to support the service, or a condition where the session operation information indicates that the terminal is to be handed over to an EPS; or
  when a fourth condition has been met, re-directing the terminal to an EPS, the fourth condition comprising at least one of a condition where the RAN is an NR base station or an eLTE base station and the service support indicator indicates that the service is not supported by an NR or an eLTE but the terminal is supported to be re-directed to an EPS to support the service, or a condition where the session operation information indicates that the terminal is to be re-directed to an EPS.

15. A Radio Access Network (RAN), comprising a processor, a memory, and a program or an instruction that is stored in the memory and that can run on the processor, wherein when the program or the instruction is executed by the processor, the following steps are implemented:
  acquiring service indication information from an Access and Mobility Management Function (AMF), the service indication information comprising support information about the service, the service comprising at least one of an emergency service or a voice service; and preforming a relevant operation on the service in accordance with the acquired service indication information and a PDU session or a QoS flow establishment request for the service,
wherein the support information about the service comprises service support type information;
wherein the service support type information is used to indicate whether redirection to Evolved Packet System (EPS) for supporting the service is possible or not,
wherein
in a first situation where the service support type information is used to indicate redirection to EPS for supporting the service is possible, the performing the relevant operation on the service in accordance with the service indication information comprises choosing one operation among the following operations: accepting a PDU session or QoS flow establishment request for the service, handing over the terminal to an enhanced Long Term Evolution (eLTE), handing over the terminal to an EPS, or re-directing the terminal to an EPS, or
in a second situation where the service support type information is used to indicate redirection to EPS for supporting the service is not possible, the performing the relevant operation on the service in accordance with the service indication information comprises choosing one operation among the following operations: accepting a PDU session or QoS flow establishment request for the service, handing over the terminal to an enhanced Long Term Evolution (eLTE), or handing over the terminal to an EPS.

16. The RAN according to claim 15, wherein the support information about the service further comprises a service support indicator;
wherein the service support indicator is used to indicate whether the service is supported, or the service support indicator is used to indicate at least one of whether the service is supported by an NR, whether the service is supported by an eLTE, or whether the service is supported by an EPS.

17. The RAN according to claim 15, wherein prior to acquiring the service indication information, the following step is implemented:
transmitting service capability information about the RAN to the AMF, and the service capability information is used to indicate whether the service is supported by the RAN.

18. The RAN according to claim 15, wherein the service indication information further comprises indication information indicating whether the service is supported in a fallback method; or
wherein the service indication information is a piece of service indication information at a location area, and a different piece of service indication information corresponds to a different location area.

19. The RAN according to claim 15, wherein the performing the relevant operation on the service in accordance with the acquired service indication information comprises:
receiving a request for establishing a PDU session or QoS flow for the service, and/or
receiving session operation information.

20. The RAN according to claim 19, wherein when the RAN has received the request for establishing a PDU session or QoS flow for the service or has received the session operation information, the performing the relevant operation on the service in accordance with the acquired service indication information comprises at least one of:
when a first condition has been met, receiving the request for establishing a PDU session or QoS flow for the service, the first condition comprising at least one of a condition where the RAN is an NR base station and the service support indicator indicates that the service is supported by the NR, a condition where the RAN is an eLTE base station and the service support indicator indicates that the service is supported by the eLTE condition, or a condition where the session operation information indicates that the request for establishing a PDU session or QoS flow for the service is to be accepted;
when a second condition has been met, handing over the terminal to the eLTE, the second condition comprising at least one of a condition where the RAN is the NR base station and the service support indicator indicates that the service is not supported by the NR but the service is supported by the eLTE, or a condition where the session operation information indicates that the terminal is to be handed over to the eLTE;
when a third condition has been met, handing over the terminal to an EPS, the third condition comprising at least one of a condition where the RAN is an NR base station or an eLTE base station and the service support indicator indicates that the service is not supported by an NR or an eLTE but the terminal is supported to be handed over to an EPS to support the service, or a condition where the session operation information indicates that the terminal is to be handed over to an EPS; or
when a fourth condition has been met, re-directing the terminal to an EPS, the fourth condition comprising at least one of a condition where the RAN is an NR base station or an eLTE base station and the service support indicator indicates that the service is not supported by an NR or an eLTE but the terminal is supported to be re-directed to an EPS to support the service, or a condition where the session operation information indicates that the terminal is to be re-directed to an EPS.

* * * * *